United States Patent
Kim et al.

(10) Patent No.: US 9,489,127 B2
(45) Date of Patent: Nov. 8, 2016

(54) METHOD FOR PROCESSING INPUT AND ELECTRONIC DEVICE THEREOF

(71) Applicant: Samsung Electronics Co., Ltd., Gyeonggi-do (KR)

(72) Inventors: Geon-Soo Kim, Gyeonggi-do (KR); Doo-Suk Kang, Gyeonggi-do (KR); Dong-Hyun Yeom, Gyeonggi-do (KR); Bo-Kun Choi, Seoul (KR); Yong-Joon Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/598,190

(22) Filed: Jan. 15, 2015

(65) Prior Publication Data
US 2015/0199555 A1 Jul. 16, 2015

(30) Foreign Application Priority Data
Jan. 15, 2014 (KR) .................. 10-2014-0005128

(51) Int. Cl.
*G06K 9/00* (2006.01)
*G06F 3/0488* (2013.01)
*G06F 3/041* (2006.01)

(52) U.S. Cl.
CPC .......... *G06F 3/04883* (2013.01); *G06F 3/041* (2013.01); *G06F 3/04886* (2013.01); *G06K 9/00013* (2013.01); *G06K 9/00355* (2013.01); *G06F 2203/0338* (2013.01); *G06F 2203/0381* (2013.01)

(58) Field of Classification Search
None
See application file for complete search history.

(56) References Cited

U.S. PATENT DOCUMENTS

| | | | | |
|---|---|---|---|---|
| 7,289,649 | B1 * | 10/2007 | Walley | G06K 9/00026 283/68 |
| 8,224,392 | B2 * | 7/2012 | Kim | G06F 3/016 345/173 |
| 8,723,643 | B2 * | 5/2014 | Wang | G06F 21/32 340/3.43 |
| 2004/0085300 | A1 | 5/2004 | Matusis | |
| 2010/0225607 | A1 * | 9/2010 | Kim | G06F 3/042 345/173 |
| 2010/0231356 | A1 * | 9/2010 | Kim | G06F 3/048 340/5.83 |
| 2011/0209098 | A1 | 8/2011 | Hinckley et al. | |
| 2013/0019199 | A1 | 1/2013 | Ko et al. | |
| 2013/0129162 | A1 | 5/2013 | Cheng et al. | |
| 2014/0002388 | A1 * | 1/2014 | Han | G06F 3/0488 345/173 |
| 2014/0003683 | A1 | 1/2014 | Vieta et al. | |
| 2015/0074615 | A1 * | 3/2015 | Han | G06K 9/00033 715/863 |

FOREIGN PATENT DOCUMENTS

| | | |
|---|---|---|
| KR | 10-2008-0035133 | 4/2008 |
| KR | 10-2011-0103598 | 9/2011 |
| KR | 10-2013-0008424 | 1/2013 |

OTHER PUBLICATIONS

Extended European Search Report dated Jun. 5, 2015 in connection with European Patent Application 15151155.7; 10 pages.
European Examination Report dated Jul. 8, 2016 in connection with European Patent Application No. 15151155.7, 8 pages.

\* cited by examiner

*Primary Examiner* — Daniel Mariam

(57) ABSTRACT

A method for operating an electronic device is provided. The method includes obtaining input information input to a display screen and fingerprint information input to a fingerprint sensor. The method also includes executing a command matching a combination of the obtained screen input information and fingerprint information.

20 Claims, 21 Drawing Sheets

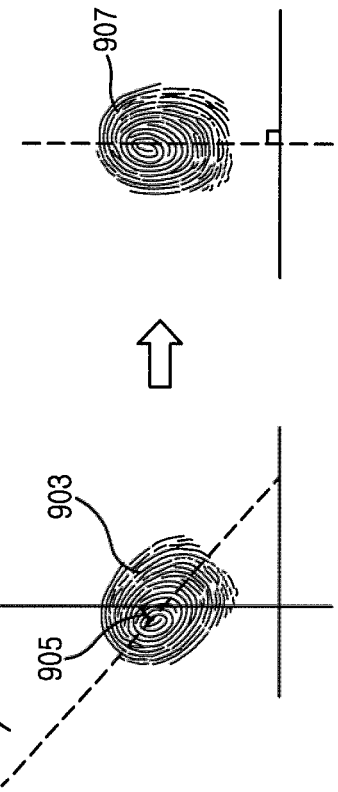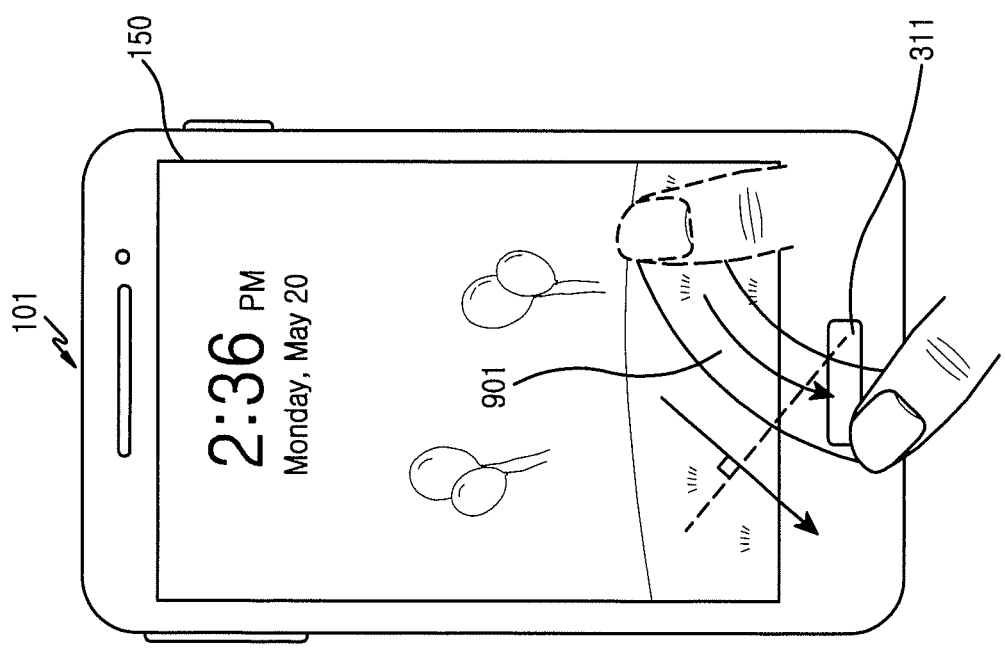

METHOD FOR PROCESSING INPUT AND ELECTRONIC DEVICE THEREOF

PRIORITY

The present application is related to and claims priority under 35 U.S.C. §119 to an application number 10-2014-0005128 filed in the Korean Intellectual Property Office on Jan. 15, 2014, the contents of which are incorporated herein by reference.

TECHNICAL FIELD

The present disclosure relates generally to a method for processing data input to an electronic device, and the electronic device thereof.

BACKGROUND

Thanks to advances of information communication technology and semiconductor technology, various electronic devices function based on information input to various input devices. The electronic device displays its operational status through a display. When the display is a touch display for inputting information to a touch screen, the electronic device functions by inputting the input information of the designated screen. Also, the electronic device receives user information through a fingerprint sensor or performs a function corresponding to the input fingerprint information.

The fingerprint information input through the fingerprint sensor is used only to determine whether it matches preset fingerprint information in the electronic device, and the use of the fingerprint information is quite limited.

SUMMARY

To address the above-discussed deficiencies of the prior art, it is a primary aspect of the present disclosure to provide various services by combining fingerprint information input to an electronic device and one or more input information.

In a first example, a method for operating an electronic device is provided. The method includes obtaining information input to a display screen and fingerprint information input to a fingerprint sensor. The method also includes executing a command matching a combination of the obtained screen input information and fingerprint information.

In a second example, an electronic device is provided. The electronic device includes a memory configured to store information input to a screen, fingerprint information, and a command corresponding to a combination of the screen input information and the fingerprint information. The electronic device also includes one or more processors configured to obtain the screen input information and the fingerprint information input to a fingerprint sensor, and execute a command matching the combination of the screen input information and the fingerprint information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that, the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: disclosure

FIGS. 9A and 9B illustrate examples of input processing in the electronic device according to an exemplary embodiment of the present disclosure;

Throughout the drawings, like reference numerals will be understood to refer to like parts, components and structures.

DETAILED DESCRIPTION

Figure 1:
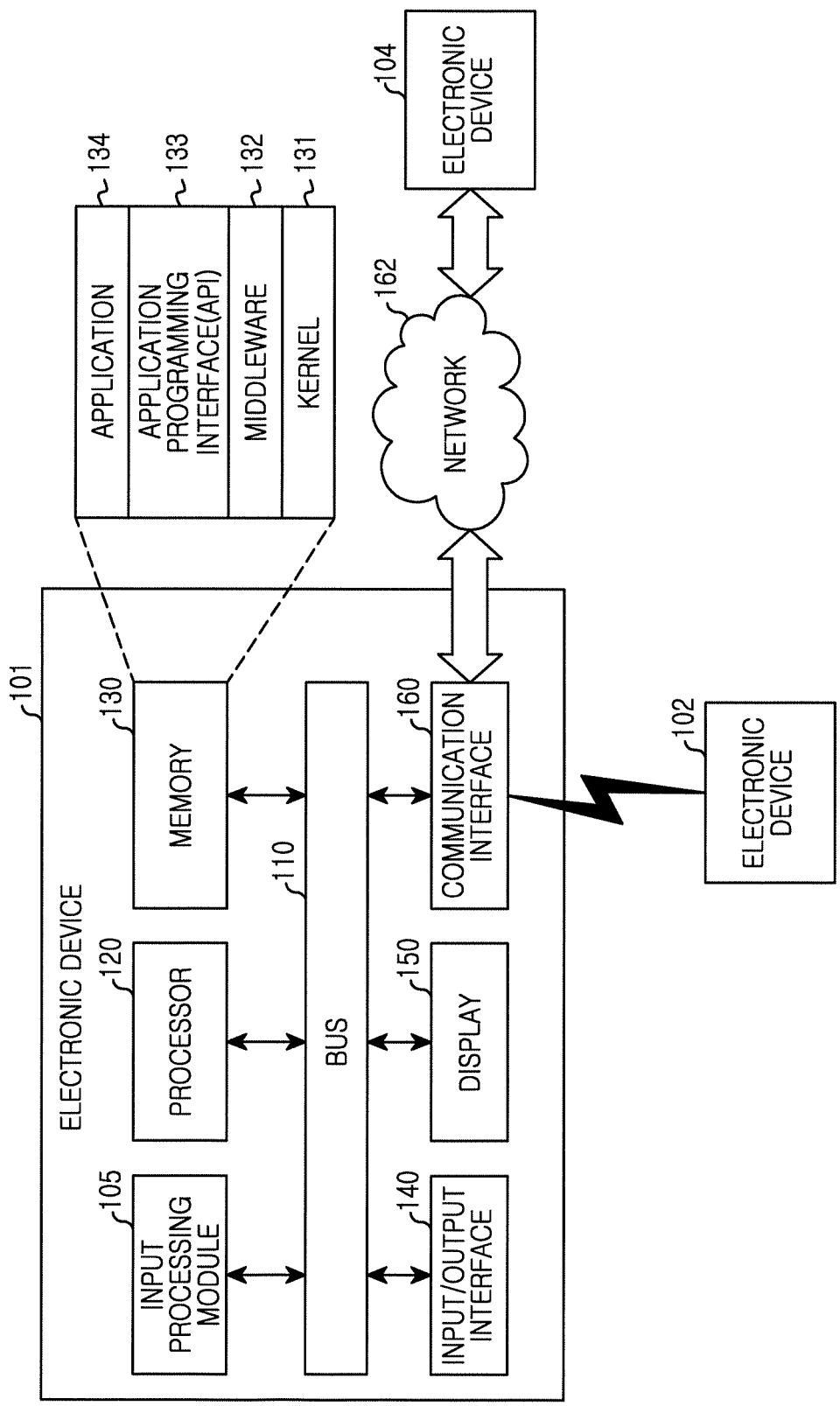
FIG. 1 illustrates an example electronic device according to this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The electronic device according to various exemplary embodiments of the present disclosure is a device including a communication function. For example, the electronic device includes a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical appliance, a camera, and a wearable device (such as at least one of a Head-Mounted-Device (HMD) such as electronic glasses, an electronic textiles, an electronic bracelet, an electronic necklace, an appcessory, and a smart watch).

The electronic device is a smart home appliance having the communication function. The smart home appliance includes, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (such as Samsung HomeSync™, AppleTV™, or Google TV™), a game console, an electronic dictionary, a digital key, a camcorder, and a digital frame.

The electronic device includes at least one of various medical appliances (such as Magnetic Resonance Angiography (MRA), Magnetic Resonance Imaging (MRI), Computed Tomography (CT), X-ray, ultrasonicator)), a navigation device, a Global Positioning System (GPS) receiver, an Event Data Recorder (EDR), a Flight Data Recorder (FDR), an in-vehicle infotainment device, marine electronic equipment (such as marine navigation device and gyro compass), avionics, and a security device.

The electronic device includes at least one of part of furniture or building/structure including the communication unction, an electronic board, an electronic signature receiving device, a projector, and various gauges (such as gauges for water, electricity, gas, and radio wave). The electronic device is one or a combination of those various devices. Those skilled in the art shall understand that the electronic device of the present disclosure is not limited those devices. Hereinafter, exemplary embodiments of the present disclosure provide an electronic device by referring to the attached drawings. The term "user" indicates a person or a device (such as an artificial intelligence electronic device) who or which uses the electronic device.

FIG. 1 illustrates an example electronic device according to this disclosure. Referring to FIG. 1, the electronic device 101 includes an input processing module 105, a bus 110, a processor 120, a memory 130, an input/output interface 140, a display 150, and a communication interface 160.

The input processing module 105 sets a function of the electronic device 101 for information including information input to a screen of the display module 150 and fingerprint information input to a fingerprint sensor by a user, and store the setting information in a database. The input processing module 105 stores in the database one or more setting information by combining one or more screen input information and one or more fingerprint information. One setting information designates and control one or more functions of the electronic device 101.

The input processing module 105 obtains the information input to the screen of the display module 150 and the fingerprint information input to a fingerprint sensor, and execute a command matching the combination of the obtained screen input information and the fingerprint information. The input processing module 105 determines whether the combination of the obtained screen input information and fingerprint information corresponds to a combination of reference screen input information and reference fingerprint information; and perform a preset function corresponding to the combination of the obtained screen input information and fingerprint information. The input processing module 105 obtains screen input information and the fingerprint information which are input with the same input means. The input processing module 105 generates the screen input information using one or more of a gesture for touching the display, a gesture for dragging the display, and a gesture for releasing the touch, with the input means. The input processing module 105 executes the command determined by distinguishing an input order of the fingerprint information and the screen input information. The input processing module 105 executes the command determined by considering input time information of the screen input information in addition to the fingerprint information and the screen input information. The input processing module 105 determines the screen input information drawn in the display by combining one or more of a spelling, a character, a string, a digit, a symbol, a figure, and a pattern. The input processing module 105 determines the screen input information comprising one or more of trace information of the drag in one or more areas of the display which is divided into one or more virtual areas, drag time information, drag length information, and a distance from an initial input point detected by the display to the fingerprint sensor. When the input means dragged in the display is detached and the drag continues by re-touching the display within a preset time, the input processing module 105 determines that the input means is not detached in the screen input information. When a drag direction changes, the input processing module 105 determines the screen input information comprising one or more of the number of changes and a changed angle. The input processing module 105 resets a slope of the fingerprint information based on the screen input information of the display.

While the input processing module 105 is explained, it is controlled by the processor 120. Further, the input processing module 105 is a separate module programmed to control, in isolation from the processor 120. The input processing module 105 programmed to control various embodiments of the present disclosure is controlled by the processor 120.

The bus 110 is a circuit for interlinking the above-stated components and transferring communication (such as control messages) between the above-stated components.

The processor 120 receives an instruction from the other components (such as the memory 130, the input/output interface 140, the display 150, and the communication interface 160) via the bus 110, interpret the received instruction, and perform an operation or a data processing according to the interpreted instruction.

The memory 130 stores the instruction or the data received from or generated by the processor 120 or the other components (such as the input/output module 140, the display 150, and the communication interface 160). For example, the memory 130 includes programming modules including, for example, a kernel 131, a middleware 132, an Application Programming Interface (API) 133, and an application 134. The programming modules is implemented using software, firmware, and hardware, or a combination of at least two of them.

The kernel 131 controls or manages system resources (such as the bus 110, the processor 120, or the memory 130) used to execute the operation or the function of the other programming modules, for example, the middleware 132, the API 133, or the application 134. Also, the kernel 131 provides an interface allowing the middleware 132, the API 133, or the application 134 to access and to control or manage the individual component of the electronic device 101.

The middleware 132 relays data between the API 133 or the application 134 and the kernel 131. In response to work requests received from the applications 134, the middleware 132 can, for example, control the work requests (such as scheduling or load balancing) by giving priority of the system resource (such as the bus 110, the processor 120, or the memory 130) of the electronic device 101 to at least one application of the application 134.

The API 133, which is an interface for the application 134 to control the function provided from the kernel 131 or the middleware 132, includes at least one interface or function for, for example, file control, window control, image processing, or text control.

The input/output interface 140 forwards an instruction or data from the user to the processor 120 or the memory 130 via the bus 110. The display 150 displays images, videos, or data to the user. When the display module 150 is a touch screen panel, the user inputs the command using the screen input information which touches or hovers (such as indirectly touches) the display module 150.

The communication interface 160 connects the communication between the electronic device 101 and an electronic device 104, an electronic device 14, or a server 106. The communication interface 160 supports a short-range communication protocol (such as Wireless Fidelity (Wi-Fi), Bluetooth (BT), Near Field Communication (NFC)), or a network communication 162 (such as Internet, Local Area Network (LAN), Wide Area Network (WAN), telecommunication network, cellular network, satellite network, or Plain Old Telephone Service (POTS)). The electronic device 102 or the electronic device 104 each can be the same as or different from the electronic device 101 in type.

Figure 2:
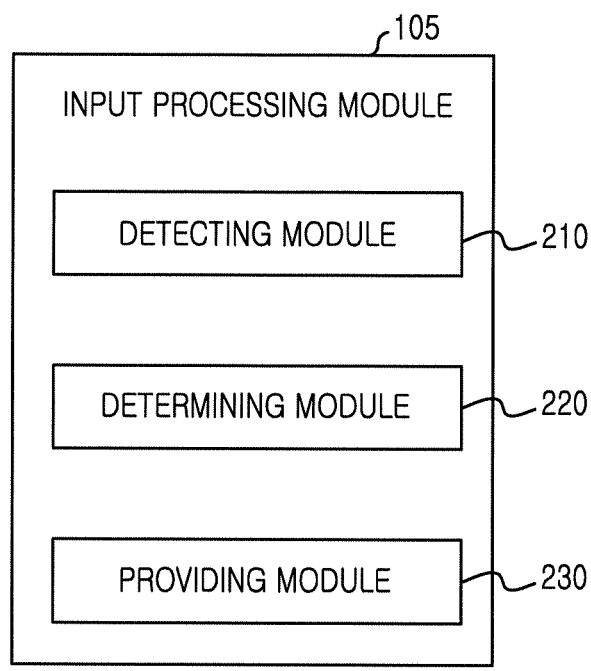
FIG. 2 illustrates an example input processing module of the electronic device according to this disclosure.

FIG. 2 illustrates an example input processing module of the electronic device according to this disclosure. Referring to FIG. 2, the input processing module 105 includes one or more of a DETERMINING MODULE DETECTING MODULE 210, a determination module 220, and a PROVIDING MODULE 230. Hereinafter, each module represents physical hardware or software including logical data. The modules are now explained in detail.

The DETERMINING MODULE DETECTING MODULE 210 detects one or more screen input information through the display module 150 of the electronic device 101, and one or more fingerprint information through the fingerprint sensor 311. The determination module 220 determines the screen input information obtained through the display module 150 and the fingerprint information obtained through the fingerprint sensor 311, as the matching setting information of the database stored in the electronic device 101. The matching information controls to perform the function of the electronic device 101 in accordance with the obtained screen input information and fingerprint information.

The PROVIDING MODULE 230 provides the preset function of the electronic device 101 corresponding to the setting information. The PROVIDING MODULE 230 performs the function of the electronic device 101 according to the setting information, and display a screen of the function of the electronic device 101 in the display module 150.

Figure 3A:
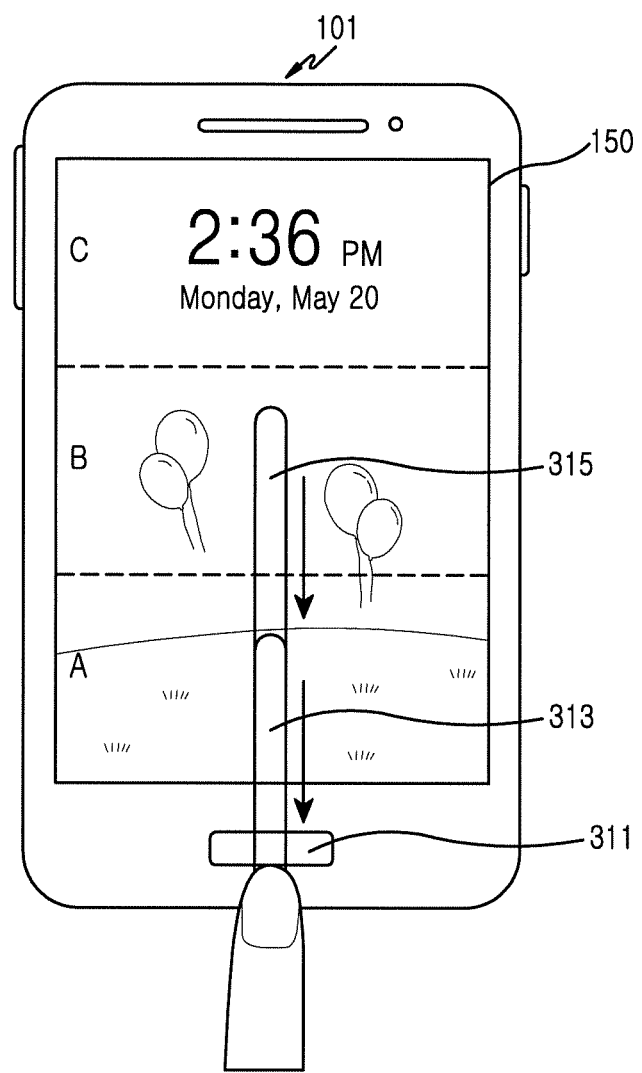
FIGS. 3A and 3B illustrate examples of input processing in the electronic device according to this disclosure.
Figure 3B:
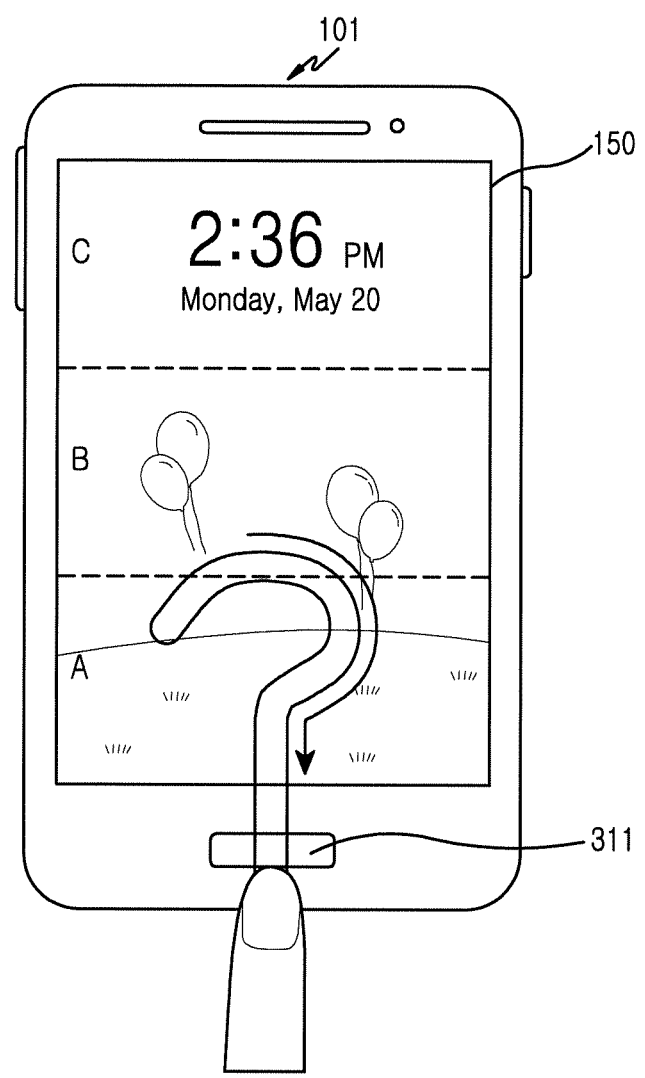

FIGS. 3A and 3B illustrate examples of input processing in the electronic device according to this disclosure. The electronic device 101 includes one or more display modules 150 and one or more fingerprint sensors 311 at preset locations. The fingerprint sensor 311 of the electronic device 101 is disposed below the display module 150 so that the user touches the display module 150 and consecutively touches the fingerprint sensor 311 with an input means. Alternatively, the fingerprint sensor of the electronic device 101 is disposed together with the display module 150 as the input means. Alternatively, the fingerprint sensor of the electronic device 101 is disposed at various locations, such as upper, side, or rear parts of the electronic device 101 as the input means.

Based on the input to a preset location of the display module 150, the electronic device 101 perform the function corresponding to a preset input type through the fingerprint sensor 311. The electronic device 101 inputs a command by dragging (such as touching, dragging, or tapping) the display module 150 through direct touch or indirect touch (such as hovering). The electronic device 101 controls to perform one or more functions by combining the command input to the display module 150 and certification of the fingerprint information input to the fingerprint sensor 311.

Now, an exemplary embodiment of the present disclosure is explained by referring to FIG. 3A. Referring to FIG. 3A, the electronic device 101 divides the display module 150 into one or more virtual areas (such as areas A, B, and C), and detects the drag input which begins in one of the divided virtual areas. The electronic device 101 detects a first input 313 which drags (such as drag downwards) in a preset pattern by touching a preset point of the area A in the display module 150 divided into the virtual areas A, B, and C, and applies the input means (such as a right forefinger) to the fingerprint sensor 311 in succession. Alternatively, the electronic device 101 detects a second input 315 which drags (such as drag downwards) in a preset pattern by touching a preset point of the area B in the display module 150 divided into the virtual areas A, B, and C, and applies the input means (such as the right forefinger) to the fingerprint sensor 311 in succession. The electronic device 101 performs a first function corresponding to the first input 313 in response to the first input 313, and performs a second function corresponding to the second input 315 in response to the second input 315. As such, the electronic device 101 identifies the area where the drag begins in the display module 150, and performs the preset operation according to the start point of the drag.

When the input detected in the display module 150 is the same or similar input type, the electronic device 101 performs a preset operation according to the fingerprint information recognized by the fingerprint sensor 311. The electronic device 101 detects a third input which drags (such as drag downwards) in a preset pattern by touching a preset point of the area A in the display module 150 divided into the virtual areas A, B, and C, and applies first fingerprint information of the input means (such as a right thumb) to the fingerprint sensor 311 in succession. Alternatively, the electronic device 101 detects a fourth input which drags (such as drag downwards) in a preset pattern by touching a preset point of the area A in the display module 150 divided into the virtual areas A, B, and C, and applies second fingerprint information of the input means (such as the right forefinger) to the fingerprint sensor 311 in succession. The electronic device 101 distinguishes the third input and the fourth input including the same or similar drag input of the display module 150 as the first fingerprint information and the second fingerprint information obtained by the fingerprint sensor 311, and performs the preset operations of the respective inputs. The electronic device 101 performs a third function corresponding to the third input in response to the detected third input, and perform a fourth function corresponding to the fourth input in response to the detected fourth input.

Now, an exemplary embodiment of the present disclosure is explained by referring to FIG. 3B. Referring to FIG. 3B, when the display module 150 is divided into one or more virtual areas (such as areas A, B, and C), the electronic device 101 detects the start point of the drag which touches a certain point in one of the divided virtual areas of the display module 150 and distinguish the input based on the touch input area including the start point of the drag. The electronic device 101 detects a first input which drags (such as drag downwards) in a preset pattern by touching a preset point of the area A in the display module 150 divided into the virtual areas A, B, and C, and applies first fingerprint information of the input means (such as the right thumb) to the fingerprint sensor 311 in succession. Alternatively, the electronic device 101 detects a second input which beings by touching a preset point of the area A in the display module 150 divided into the virtual areas A, B, and C, drags to the area B or C, and then consecutively applies first fingerprint information of the input means (such as the right thumb) to the fingerprint sensor 311. As such, the electronic device 101 determines the same input with respect to the input start and the detected fingerprint information in the same input start area A of the display module 150 divided into one or more virtual areas (such as areas A, B, and C), and perform the same function with respect to the first input and the second input.

Figure 4A:
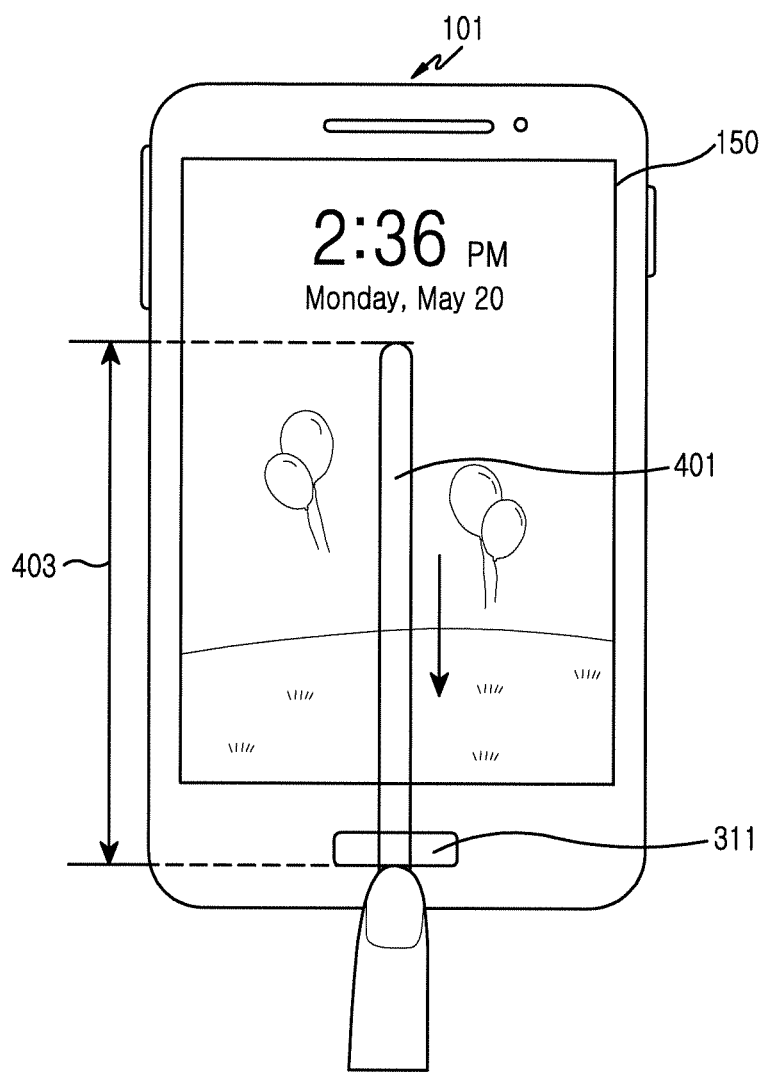
FIGS. 4A and 4B illustrate examples of input processing in the electronic device according to this disclosure.
Figure 4B:
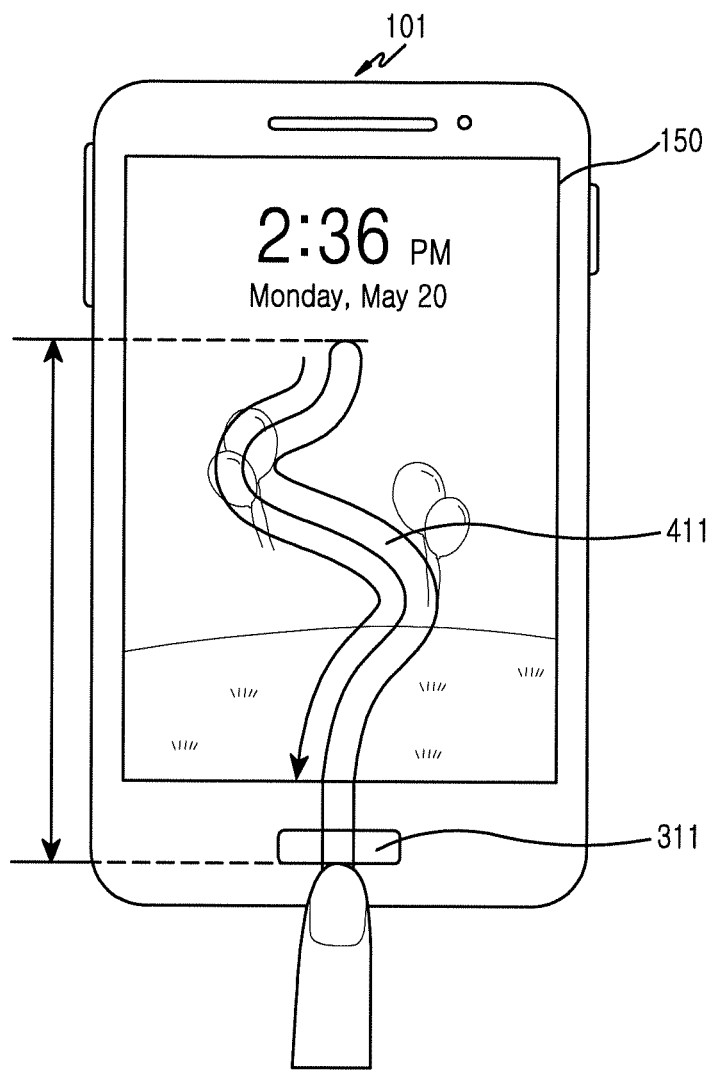

FIGS. 4A and 4B illustrate examples of input processing in the electronic device according to this disclosure. The electronic device 101 performs a preset operation according to a length of the drag input to the display module 150 before the fingerprint sensor 311 detects the input means. Now, an exemplary embodiment of the present disclosure is explained by referring to FIG. 4A.

Referring to FIG. 4A, the electronic device 101 commences the drag input by touching a preset point of the display module 150, drag in a preset pattern, and consecutively apply the input means to the fingerprint sensor 311. The electronic device 101 detects the length of the drag input to the display module 150 before the input means is applied to the fingerprint sensor 311. For example, the electronic device 101 performs a first input 401 which touches a point of the display module 150 with the input means (such as the right forefinger), drags downwards, and trips the fingerprint sensor 311 with the input means (such as the right forefinger). The electronic device 101 detects the length 403 of the drag input to the display module 150 before the input means is applied to the fingerprint sensor 311 in the first input. The electronic device 101 performs the preset function corresponding to the drag length 403 and the fingerprint information input to the fingerprint sensor 311.

Now, an exemplary embodiment of the present disclosure is explained by referring to FIG. 4B. The electronic device 101 performs the function corresponding to the input of the display module 150 and the fingerprint sensor 311. The electronic device 101 detects the length of the drag input to the display module 150 before the fingerprint sensor 311 detects the input means, and performs the function corresponding to the drag length 411 of the display module 150 and the fingerprint information of the fingerprint sensor 311. For example, the electronic device 101 performs a second input 411 which touches the same point as the drag start point of the first input with the same input means as the input means of the first input 401 in the display module 150, drags longer than the first input, and trips the fingerprint sensor 311 with the input means. Based on the drag length of the first input and the drag length of the second input, the electronic device 101 determines different functions corresponding to the first input and the second input. When setting the function of the electronic device 101 based on the drag input of the display module 150 and the fingerprint information input to the fingerprint sensor 311, the electronic device 101 defines the drag length of the display module 150 in two or more ranges.

Figure 5A:
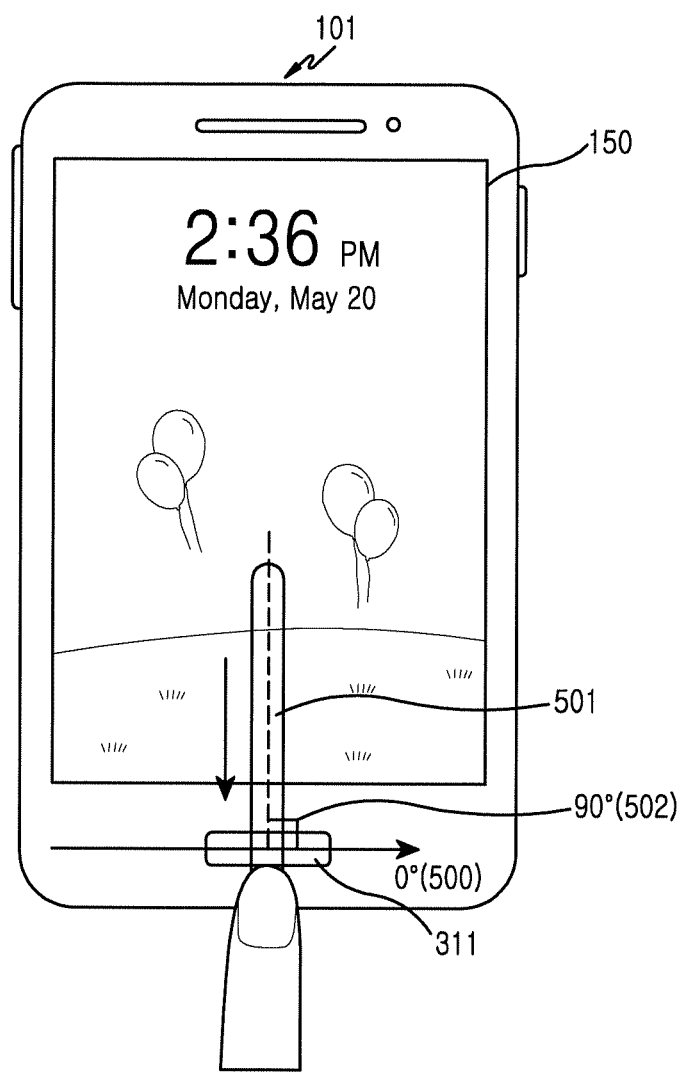
FIGS. 5A, 5B, and 5C illustrate examples of input processing in the electronic device according to this disclosure.
Figure 5B:
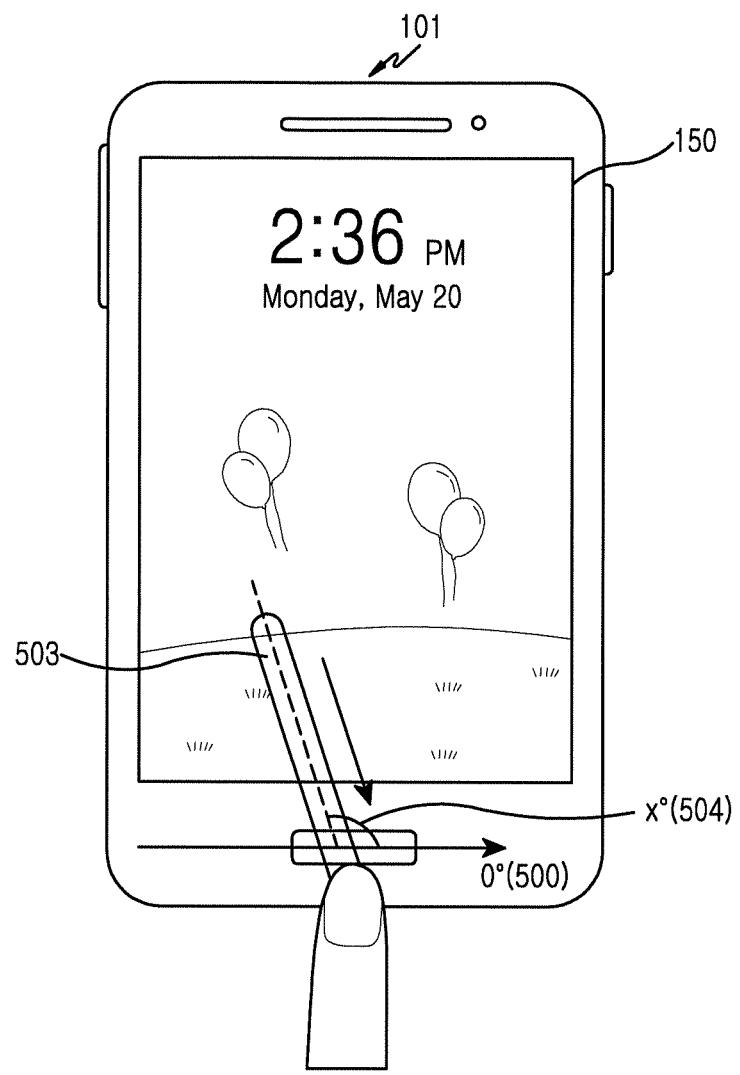
Figure 5C:
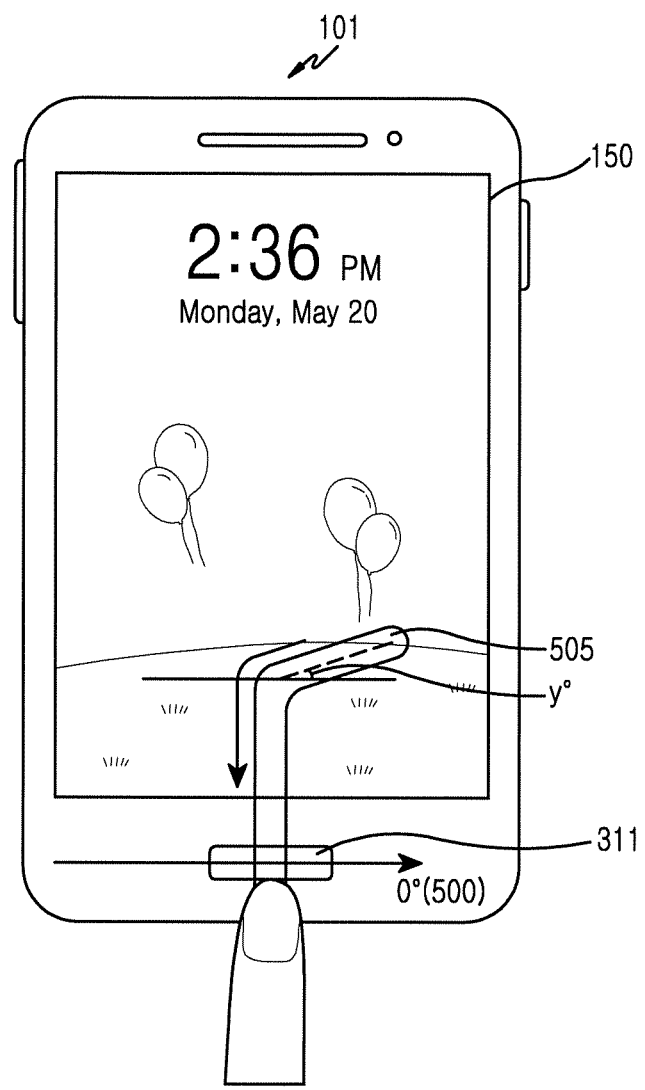

FIGS. 5A, 5B, and 5C illustrate examples of input processing in the electronic device according to this disclosure. For the input to the display module 150 and the fingerprint sensor 311, the electronic device 101 sets a virtual coordinate system and detect a direction of the drag input of the display module 150 or a direction for detecting the input means in the fingerprint sensor 311 based on the virtual coordinate system. Herein, the virtual coordinate system (such as a virtual coordinate system 500 in FIGS. 5A, 5B, and 5C) measures an angle based on a preset reference angle using a circular method. The electronic device 101 performs the preset function corresponding to the drag direction (or angle) in the display module 150, a change of the drag direction, or the direction for tripping the fingerprint sensor 311 with the input means.

Now, an exemplary embodiment of the present disclosure is explained by referring to FIG. 5A. Referring to FIG. 5A, the electronic device 101 detects the direction of the drag input to the display module 150 or the fingerprint information input to the fingerprint sensor 311 based on the virtual coordinate system 500 of the display module 150 or the fingerprint sensor 311. For example, the electronic device 101 drags an input 501 of FIG. 5A by touching a preset point of the display module 150 so that the fingerprint sensor 311 recognizes the input means in a vertical direction. The electronic device 101 determines the drag direction of the display module 150 or the fingerprint information detection direction of the fingerprint sensor 311. For example, the electronic device 101 performs the function corresponding to the angle of 90 degrees (unit: degrees, °) 502 of the determined direction of the input 501.

Now, an exemplary embodiment of the present disclosure is explained by referring to FIG. 5B. Referring to FIG. 5B, the electronic device 101 detects the direction of the drag input to the display module 150 or the fingerprint information input direction of the fingerprint sensor 311 based on the virtual coordinate system 500 of the display module 150 or the fingerprint sensor 311. For example, the electronic device 101 starts an input of FIG. 5B by touching a preset point of the display module 150 so that the fingerprint sensor 311 recognizes the input means at a preset angle in the upper left diagonal direction. The electronic device 101 determines the drag direction of the display module 150 or the fingerprint information detection direction of the fingerprint sensor 311. For example, the electronic device 101 performs the function corresponding to the angle of x degrees (such as 120 degrees) 504 of the determined input 503.

Now, an exemplary embodiment of the present disclosure is explained by referring to FIG. 5C. Referring to FIG. 5C, the electronic device 101 detects the drag input direction of the display module 150 or the fingerprint information input direction of the fingerprint sensor 311 based on the virtual coordinate system 500 of the display module 150 or the fingerprint sensor 311. When the drag direction changes once or more times in the display module 150, the electronic device 101 detects the changed drag direction. For example, the electronic device 101 detects one or more changes of the drag direction which originates from the preset point of the display module 150, in an input 505 of FIG. 5C. For example, the electronic device 101 detects the input which touches a preset point of the display module 150, drags in a lower left direction, and changes the drag direction (such as changes y degrees 560). The electronic device 101 detects the drag which changes the direction and proceeds in the changed direction in the display module 150. The electronic device 101 detects the fingerprint information of the input means input to the fingerprint sensor 311 in succession to the drag, and perform the corresponding function based on the drag input of the changed direction and the input fingerprint information.

Figure 6A:
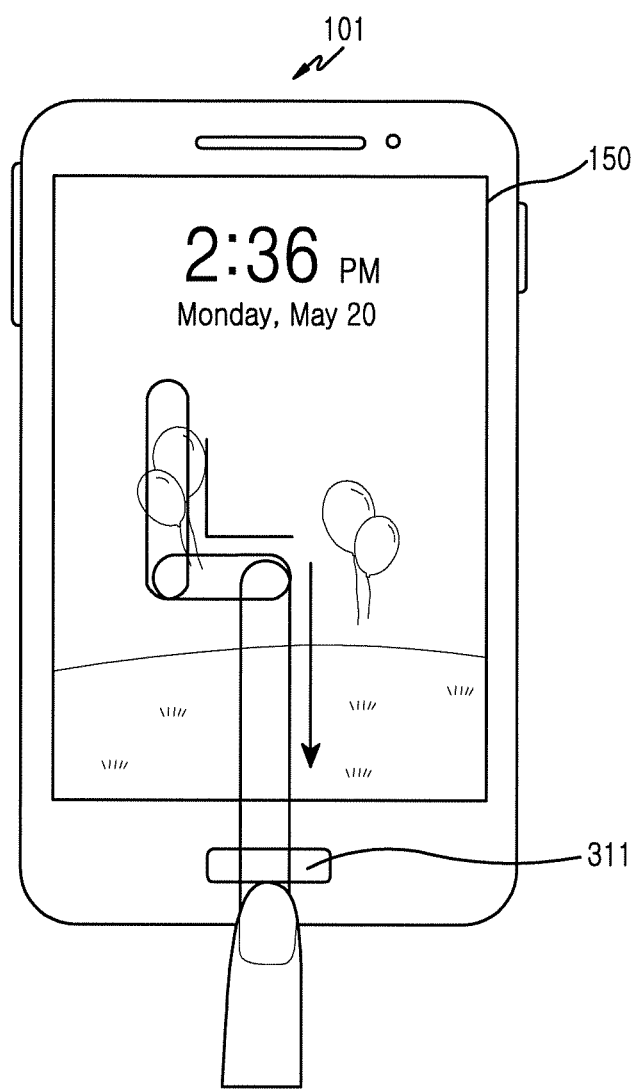
FIGS. 6A and 6B illustrate examples of input processing in the electronic device according to this disclosure.
Figure 6B:
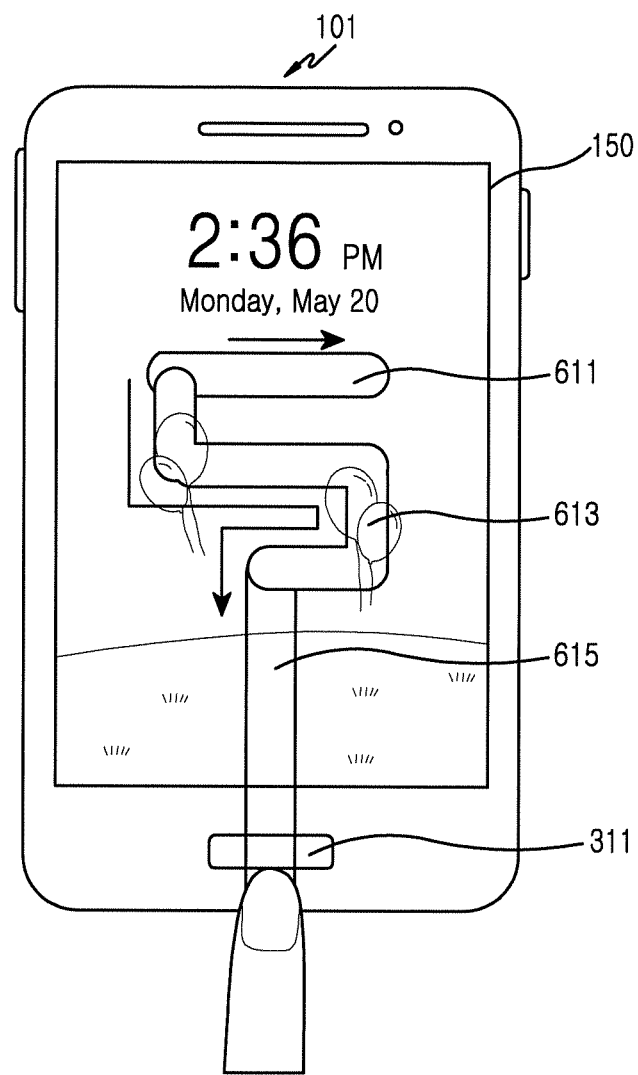

FIGS. 6A and 6B illustrate examples of input processing in the electronic device according to this disclosure. The electronic device 101 presets the function based on the input to the display module 150 and the fingerprint sensor 311 by distinguishing one or more information (such as patterns) input to the display module 150 by the user.

Now, an exemplary embodiment of the present disclosure is explained by referring to FIG. 6A. Referring to FIG. 6A, the electronic device 101 inputs the drag of a preset pattern to the display module 150 with the input means, and consecutively input the fingerprint information of the input means to the fingerprint sensor 311. The electronic device 101 performs the preset function based on the input information of the display module 150 or the input fingerprint information of the fingerprint sensor 311. The electronic device 101 detects the input pattern in the display module 150. The electronic device 101 determines whether the input information of the display module 150 is a preset pattern of the memory 130. For example, the electronic device 101 detects the input information (such as a pattern 'ㄴ') to the display module 150 with the input means, and successively obtains the fingerprint information of the fingerprint sensor 311. The electronic device 101 executes one or more programs for displaying a first webpage corresponding to the pattern 'ㄴ' input to the display module 150, and display the first webpage in the display module 150. In response to the input through the display module 150, the electronic device 101 determines the preset pattern of the memory by combining one or more of, for example, a spelling, a character, a string, a digit, a symbol, a figure, and a pattern.

Now, an exemplary embodiment of the present disclosure is explained by referring to FIG. 6B. Referring to FIG. 6B, when determining the preset function based on the drag input to the display module 150 and the fingerprint information input to the fingerprint sensor 311, the electronic device 101 determines the preset function based on the input information to the display module 150. For example, the electronic device 101 detects the input information (such as a pattern of the digit '5') in the display module 150 with the input means, and successively obtains the fingerprint information input to the fingerprint sensor 311.

When obtaining the input digit information '5', the electronic device 101 detects one or more taps of the input means from the display module 150 during the touch-and-drag on the display module 150. The electronic device 101 completes the pattern input of the digit '5' in the display module 150 by detaching the input means during the drag input 611 and then re-touching and re-dragging the display module 150 with the input means 613. When the touch is released during the drag input and the display module 150 detects the touch again, the electronic device 101 determines whether a time interval between the touch release and the re-touch is shorter than a preset time interval. When the time interval between the touch release and the re-touch is shorter than the presets time interval, the electronic device 101 determines that the corresponding touch and drag follows the pattern input of the digit '5' before the touch release. The electronic device 101 recognizes the preset pattern (such as the digit '5') in the display module 150 with the input means, successively recognize the fingerprint information of the input means in the fingerprint sensor 311, and perform the preset function corresponding to the input digit '5' and the fingerprint information.

When determining the function based on the input pattern of the display module 150 and the fingerprint information, the electronic device 101 may not refer to the drag (such as the drag 615 during the movement to input the fingerprint information of the input means to the fingerprint sensor 311) of the preset pattern input to the display module 150 shortly before the fingerprint information is input to the fingerprint sensor 311.

Figure 7A:
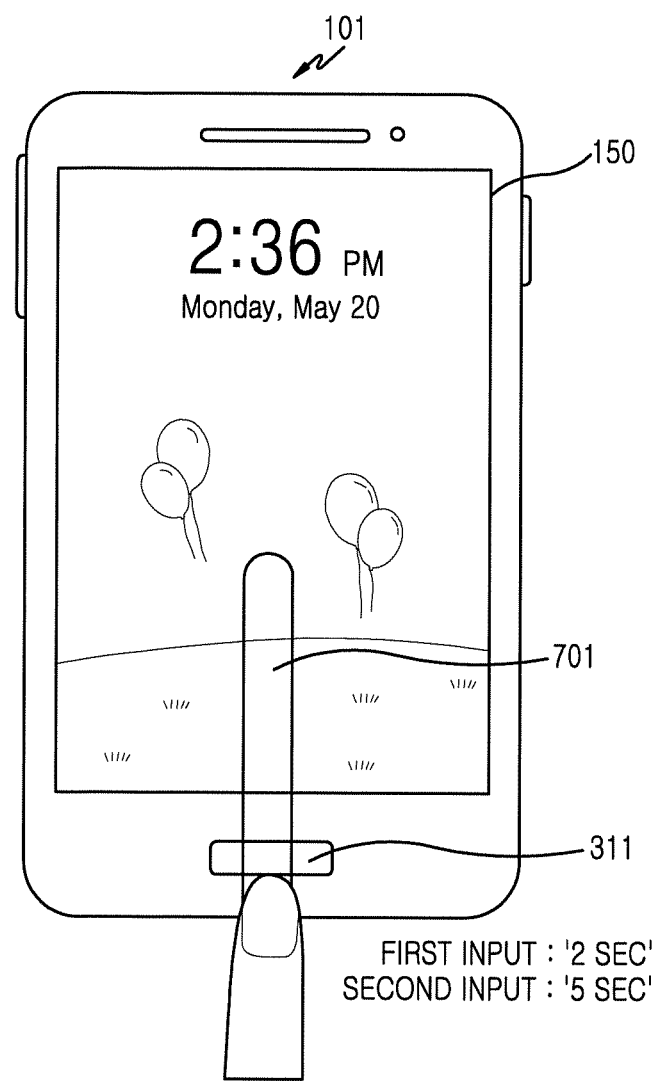
FIGS. 7A and 7B illustrate examples of input processing in the electronic device according to this disclosure.
Figure 7B:
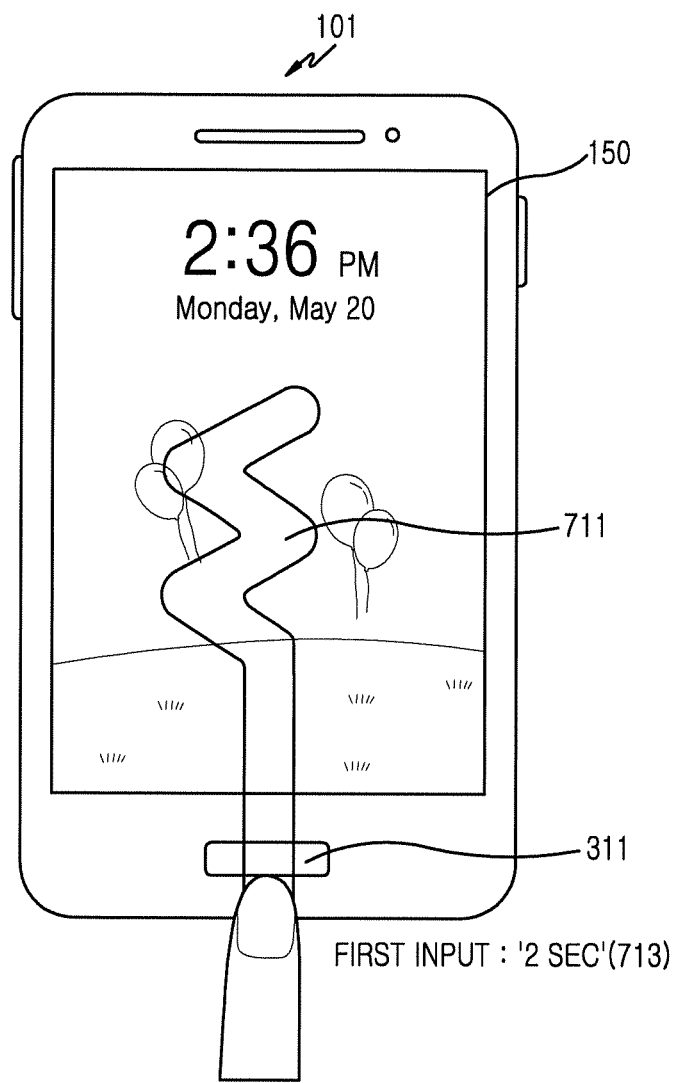

FIGS. 7A and 7B illustrate examples of input processing in the electronic device according to this disclosure. When determining the corresponding command based on the input pattern of the display module 150 and the input fingerprint information of the fingerprint sensor 311, the electronic device 101 determines the preset function corresponding to the input by referring to the time taken from the touch on the display module 150 to the fingerprint information input to the fingerprint sensor 311.

Now, an exemplary embodiment of the present disclosure is explained by referring to FIG. 7A. Referring to FIG. 7A, the electronic device 101 determines the corresponding command based on the input of the display module 150 and the fingerprint sensor 311 and the input time information. For example, when a first input 701 through the display module 150 and the fingerprint sensor 311 is applied within 3 seconds, the electronic device 101 performs the function (such as a first program call) corresponding to the first input 701. Based on the first input 701, the electronic device 101 detects the drag input which begins by touching a preset point of the display module 150 with the input means, and its drag pattern. The electronic device 101 obtains the time (such as 2 seconds) taken from the drag to the input means fingerprint information input of the fingerprint sensor 311.

The electronic device 101 determines that the first input 701 of the display module 150 and the fingerprint sensor 311 is completed within 3 seconds, and call the first preset program. Alternatively, when a second input which is the same as the first input 701 in the display module 150 and the fingerprint sensor 311 exceeds 3 seconds, the electronic device 101 performs the function (such as a second program call) corresponding to the second input. Based on the second input, the electronic device 101 detects the drag input which begins by touching a preset point of the display module 150 with the input means, and its drag pattern. The electronic device 101 obtains the time (such as 5 seconds) taken from the drag to the input means fingerprint information input of the fingerprint sensor 311. The electronic device 101 determines that the second input of the display module 150 and the fingerprint sensor 311 exceeds 3 seconds, and thus call the second preset program.

The electronic device 101 obtains the drag input to the display module 150 in the preset pattern, the fingerprint information input to the fingerprint sensor 311, and the time taken to input the drag and the fingerprint information. Although the same or similar drag is input to the display module 150 and the same input means inputs the same fingerprint information to the fingerprint sensor 311, the electronic device 101 performs a different function according to the finish time of the second input.

In FIG. 7A, the electronic device 101 distinguishes the second input finished within 3 seconds and the second input finished over 3 seconds. The electronic device 101 is not limited to the function corresponding to the second input based on the reference time. The electronic device 101 performs the function corresponding to a preset time range according to whether the second input in the display module 150 and the fingerprint sensor 311 falls within one of one or more preset time ranges (such as 1~3 seconds, 3~5 seconds, 5~7 seconds).

Now, an exemplary embodiment of the present disclosure is explained by referring to FIG. 7B. Referring to FIG. 7B, the electronic device 101 performs the preset function based on the touch duration time of the display module 150 and the fingerprint information input to the fingerprint sensor 311. For example, the electronic device 101 sets its function corresponding to the time interval (such as the touch duration time on the display module 150) between the touch on the display module 150 and the fingerprint information detection of the fingerprint sensor 311. The electronic device 101 determines that the finish time of an input 711 in the display module 150 and the fingerprint sensor 311 is 2.713 seconds, and perform the preset function (such as the first program call) corresponding to 2.713 seconds based on the setting information. Alternatively, when setting the function corresponding to the touch duration time of the display module 150 and the fingerprint information input to the fingerprint sensor 311, the electronic device 101 determines the same fingerprint information input to the fingerprint sensor 311 even though the pattern input to the display module 150 in the first input 701 of FIG. 7A is different from the input pattern of the display module 150 of the input 711. With the same touch duration time (such as 2 seconds) of the display module 150, the electronic device 101 calls the first program corresponding to the input 711.

Figure 8A:
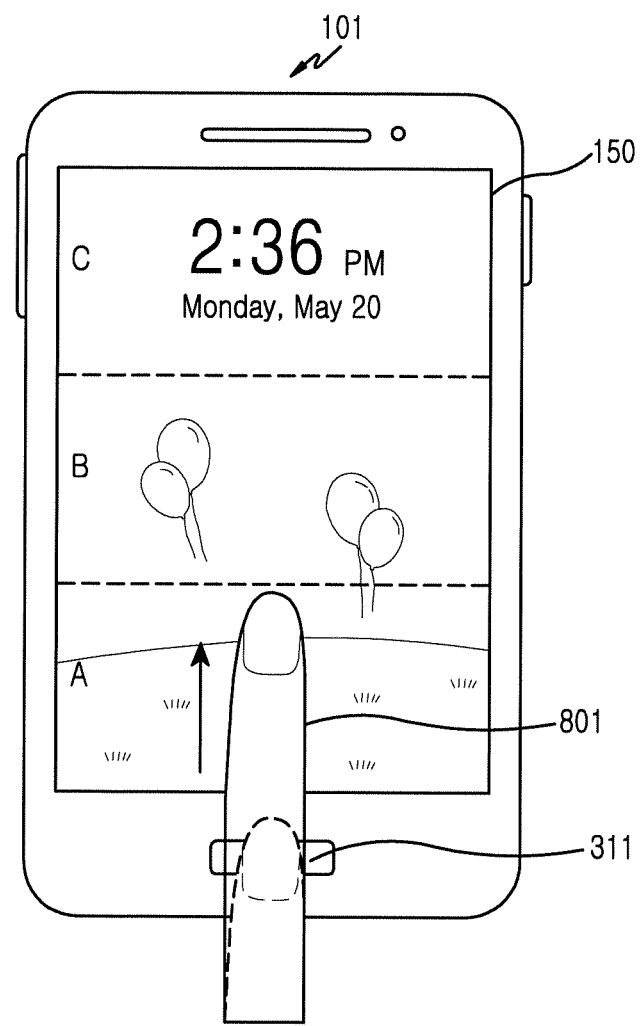
FIGS. 8A and 8B illustrate examples of input processing in the electronic device according to this disclosure.
Figure 8B:
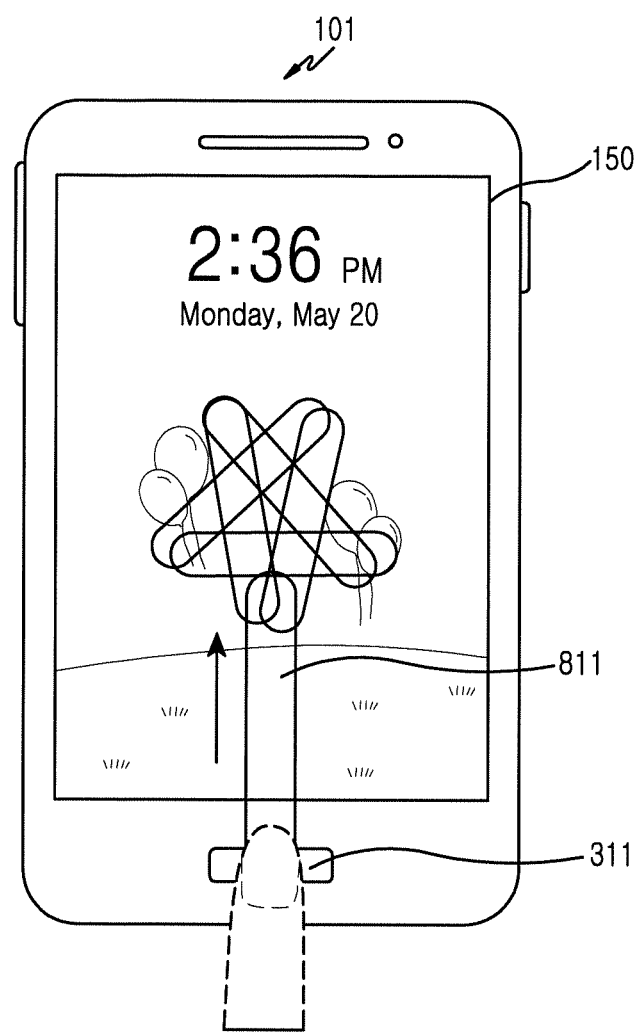

FIGS. 8A and 8B illustrate examples of input processing in the electronic device according to this disclosure. Now, an exemplary embodiment of the present disclosure is explained by referring to FIG. 8A. The electronic device 101 sets its function based on the input order of dragging a preset pattern by touching the display module 150 and successively inputting the fingerprint information to the fingerprint sensor 311. For example, when setting the function corresponding to the information input to a first preset screen of the display module 150 and the first fingerprint information input of the preset finger, the electronic device 101 sets different functions for the case where the information input to the first screen and then the first fingerprint information input and the case where the first fingerprint information input and then the information input to the first screen.

The electronic device 101 inputs the fingerprint information of the input means to the fingerprint sensor 311, successively drag to a preset point of the area A of the display module 150 divided into the virtual areas A, B, and C, and release the touch of the input means. When the preset function corresponding to the input fingerprint information, the successive drag on the display module 150, and the touch release 801 in the area A is a camera mode in the electronic device 101, the electronic device 101 enters the camera mode. Conversely, when the information is input to the screen and then the fingerprint information is input in the camera mode, the electronic device 101 performs a preset operation, not the camera mode.

Now, an exemplary embodiment of the present disclosure is explained by referring to FIG. 8B. Referring to FIG. 8B, the electronic device 101 inputs the fingerprint information of the input means to the fingerprint sensor 311 and successively drag a preset pattern on the display module 150. For example, the electronic device 101 inputs the fingerprint information of the input means to the fingerprint sensor 311, successively drag a preset pattern (such as a star-shaped pattern of the input 811) on the display module 150, and detach the input means from the display module 150 after completing the drag input of the preset pattern. The electronic device 101 performs the preset function corresponding to the input 811 to the display module 150 following the fingerprint information input to the fingerprint sensor 311. The electronic device 101 presets not only the star-shaped pattern but also triangular, quadrangular, circular, and various geometrical patterns input by the user.

FIGS. 9A and 9B illustrate examples of input processing in the electronic device according to an exemplary embodiment of the present disclosure. When obtaining the fingerprint information input to the fingerprint sensor 311 in combination with the drag input to the display module 150, the electronic device 101 resets the fingerprint information input to the fingerprint sensor 311 based on the drag input of the display module 150.

Referring to FIG. 9A, the electronic device 101 detects the drag on the display module 150. The electronic device 101 determines a slope of the fingerprint information input to the fingerprint sensor 311 based on an input 910 on the display module 150 and the fingerprint sensor 311. For example, the electronic device 101 traces the drag on the display module 150 and determines the drag slope or a slope change based on virtual coordinates on the display module 150. The electronic device 101 determines the slope of the fingerprint information input to the fingerprint sensor 311 following the drag on the display module 150, based on the slope of the drag input or the slope change obtained before the fingerprint information is input to the fingerprint sensor 311.

Referring to FIG. 9B, the electronic device 101 resets the slope of fingerprint information 903 by applying the slope 905 determined from the drag input 901 to the obtained fingerprint information 903. For example, the electronic device 101 determines the slope of the input fingerprint information based on the slope of the input information to the screen of the display module 150 or the slope change, and rotates the input fingerprint information within the detectable range. The electronic device 101 compares the reset fingerprint information 907 with one or more preset fingerprint information.

FIGS. 10A through 10D illustrate an example method for processing the input in the electronic device according to this disclosure. The electronic device 101 performs the preset function corresponding to the input information based on the input information of the display module 150 and the fingerprint sensor 311.

Figure 10A:
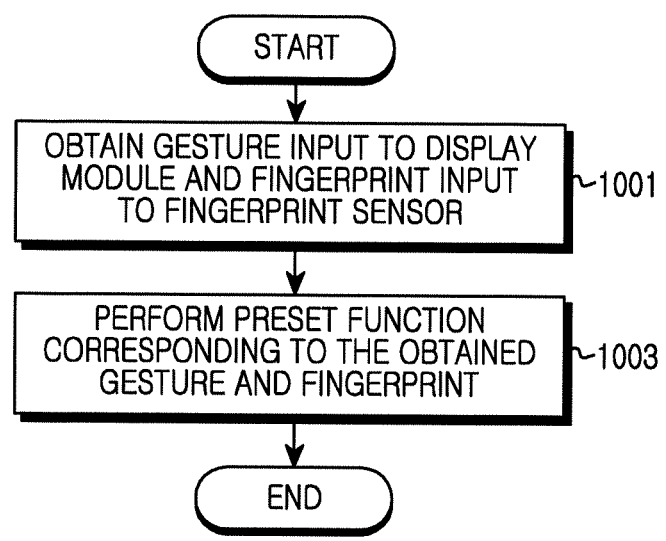
FIGS. 10A through 10D illustrate an example method for processing the input in the electronic device according to this disclosure.

Now, an exemplary embodiment of the present disclosure is explained by referring to FIG. 10A. In step 1001, the electronic device 101 obtains the input information of the display module 150 and the fingerprint sensor 311. For example, the electronic device 101 obtains the information input to the screen with respect to the drag input which draws a preset pattern by touching and dragging the display module 150 with the input means, and obtains the fingerprint information of the input means input to the fingerprint sensor 311. When obtaining the screen input information and the fingerprint information, the electronic device 101 obtains one or more information about whether the fingerprint information is input first and the information is input to the screen in succession, whether the information is input to the screen and the fingerprint information is input in succession, the number of one or more taps and re-touches (and the drags) of the input means in the display module 150 during the screen input information input, the number of one or more drag direction changes during the screen input information input, and the information input time to the screen of the display module 150.

In step 1003, the electronic device 101 determines the preset command based on the obtained screen input information and fingerprint information. For example, the electronic device 101 determines in the memory 130 the preset command matching the pattern of the screen input information and the fingerprint information, and perform the determined operation.

To determine the function corresponding to the obtained screen input information and fingerprint information, when obtaining the screen input information determined as the same pattern input and the fingerprint information determined as the same fingerprint information, the electronic device 101 sets different functions by determining whether the information is input to the screen and the fingerprint information is input in succession or whether the fingerprint information is input and the information is input to the screen in succession.

The electronic device 101 determines the corresponding function based on the drag time information while still touching the display module 150 in addition to the obtained screen input information and fingerprint information. When determining the function matching the screen input information, the fingerprint information, and the time information based on the setting information, the electronic device 101 determines the function matching the touch duration time and the fingerprint information of the display module 150 without considering the drag input pattern on the display module 150, and determine the matching function based on all of the drag input pattern on the display module 150, the touch duration time of the display module 150, and the fingerprint information. Next, the electronic device 101 finishes this process of FIG. 10A.

Figure 10B:
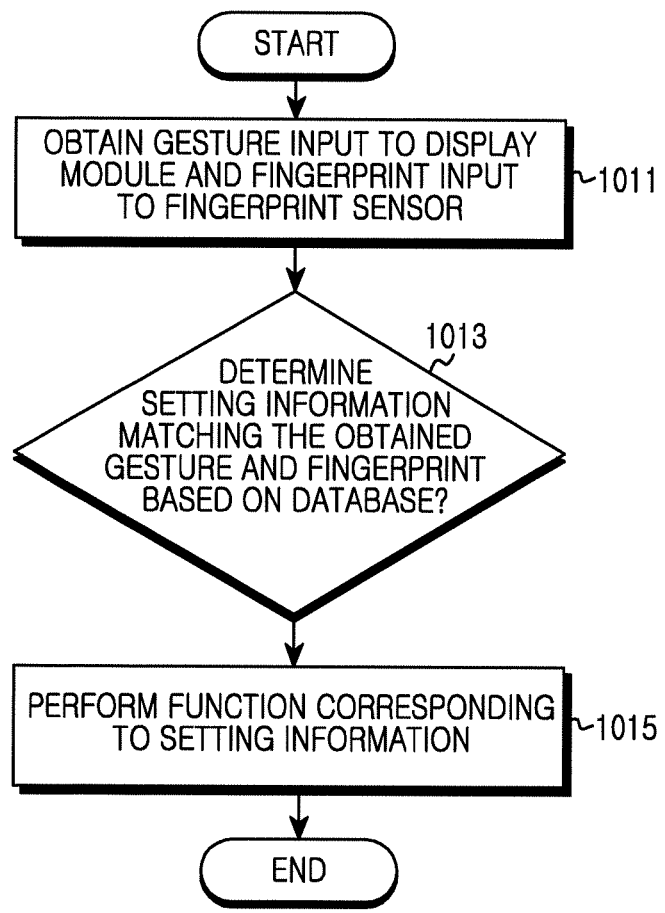

Now, an exemplary embodiment of the present disclosure is explained by referring to FIG. 10B. In step 1011, the electronic device 101 obtains the input information of the display module 150 and the fingerprint sensor 311. For example, the electronic device 101 obtains the information input to the screen with respect to the drag input which draws a preset pattern by touching and dragging the display module 150 with the input means, and obtains the fingerprint information of the input means input to the fingerprint sensor 311. When obtaining the screen input information and the fingerprint information, the electronic device 101 obtains one or more information about whether the fingerprint information is input first and the information is input to the screen in succession, whether the information is input to the screen and the fingerprint information is input in succession, the number of one or more taps and re-touches (and the drags) of the input means in the display module 150 during the screen input information input, the number of one or more drag direction changes during the screen input information input, and the information input time to the screen of the display module 150.

In step 1013, the electronic device 101 determines the setting information matching the screen input information and the fingerprint information by referring to the database. The setting information is stored in the database of the electronic device 101 by designating one or more functions for the combinations of the preset screen input information input to the screen of the display module 150 and the fingerprint information input to the fingerprint sensor. The electronic device 101 includes one or more setting information in the database. The electronic device 101 goes to step 1015 when determining the setting information matching the obtained screen input information and the obtained fingerprint information, and finish this process of FIG. 10B when not determining the matching setting information.

In step 1015, the electronic device 101 performs the preset operation according to the determined setting information. The electronic device 101 displays the screen of the preset operation corresponding to the determined setting information in the display module 150. Next, the electronic device 101 finishes this process of FIG. 10B.

Figure 10C:
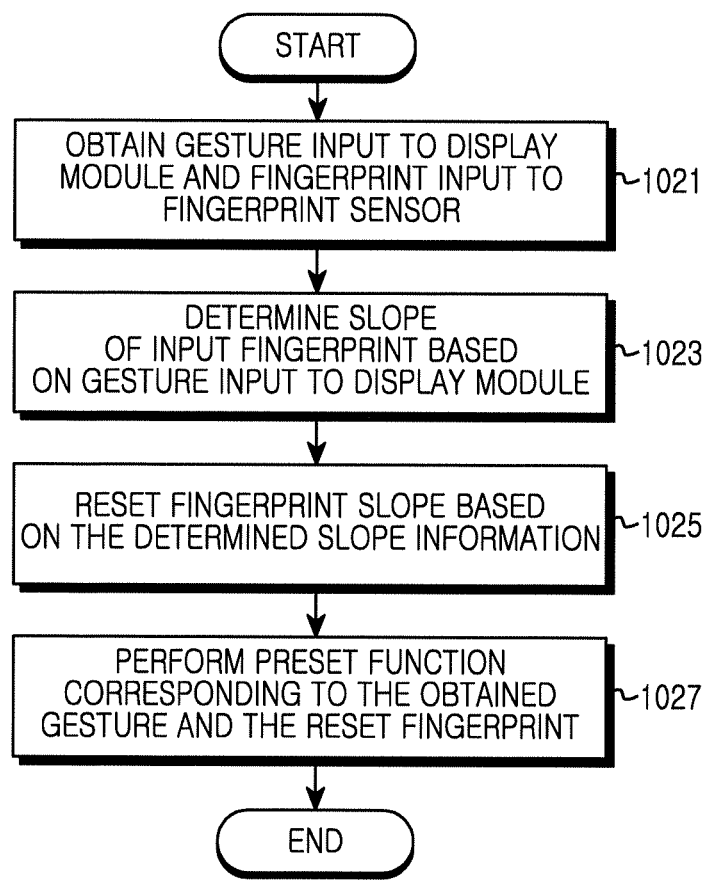

Now, an exemplary embodiment of the present disclosure is explained by referring to FIG. 10C. In step 1021, the electronic device 101 obtains the input information of the display module 150 and the fingerprint sensor 311. For example, the electronic device 101 obtains the information input to the screen with respect to the drag input which draws a preset pattern by touching and dragging the display module 150 with the input means, and obtains the fingerprint information of the input means input to the fingerprint sensor 311. When obtaining the information input to the screen and the fingerprint information, the electronic device 101 obtains one or more information about whether the fingerprint information is input first and the information is input to the screen in succession, whether the information is input to the screen and the fingerprint information is input in succession, the number of one or more taps and re-touches (and the drags) of the input means in the display module 150 during the screen input information input, the number of one or more drag direction changes during the screen input information input, and the information input time to the screen of the display module 150.

In step 1023, the electronic device 101 determines the slope of the fingerprint information input to the fingerprint sensor 311 based on the screen input information of the display module 150. For example, when the information is input to the screen of the display module 150 and the fingerprint information is input to the fingerprint sensor 311 in succession, the electronic device 101 applies the slope of the screen input information of the display module 150 before the fingerprint information input, to the slope of the fingerprint information input to the fingerprint sensor 311. For example, when the fingerprint information is input to the fingerprint sensor 311 and the information is input to the screen of the display module 150 in succession, the electronic device 101 applies the slope of the screen input information of the display module 150 after the fingerprint information input, to the slope of the fingerprint information input to the fingerprint sensor 311.

In step 1025, the electronic device 101 resets (corrects) the fingerprint information input to the fingerprint sensor 311 based on the screen input information of the display module 150. When not determining the same or similar fingerprint information stored in the electronic device 101, as or to the fingerprint information input to the fingerprint sensor 311, the electronic device 101 resets the slope of the fingerprint information determined based on the screen input information of the display module 150, to the slope for detecting the fingerprint information. The electronic device 101 corrects the slope of the fingerprint information by rotating the fingerprint information input to the fingerprint sensor 311 clockwise or counterclockwise.

In step 1027, the electronic device 101 determines the preset command based on the obtained screen input information and fingerprint information. For example, the electronic device 101 determines the preset function command matching the pattern of the screen input information and the fingerprint information, in the memory 130, and perform the determined operation.

For example, to determine the function corresponding to the obtained screen input information and fingerprint information, when obtaining the screen input information determined as the same pattern input and the fingerprint information determined as the same fingerprint information, the electronic device 101 sets different functions by determining whether the information is input to the screen and the fingerprint information is input in succession or whether the fingerprint information is input and the information is input to the screen in succession.

The electronic device 101 determines the corresponding function based on the drag time information during the touch on the display module 150 in addition to the obtained screen input information and fingerprint information. When determining the function matching the screen input information, the fingerprint information, and the time information based on the setting information, the electronic device 101 determines the function matching the touch duration time and the fingerprint information of the display module 150 without considering the drag pattern input to the display module 150, and determine the matching function based on all of the drag pattern input to the display module 150, the touch duration time on the display module 150, and the fingerprint information. Next, the electronic device 101 finishes this process of FIG. 10C.

Figure 10D:
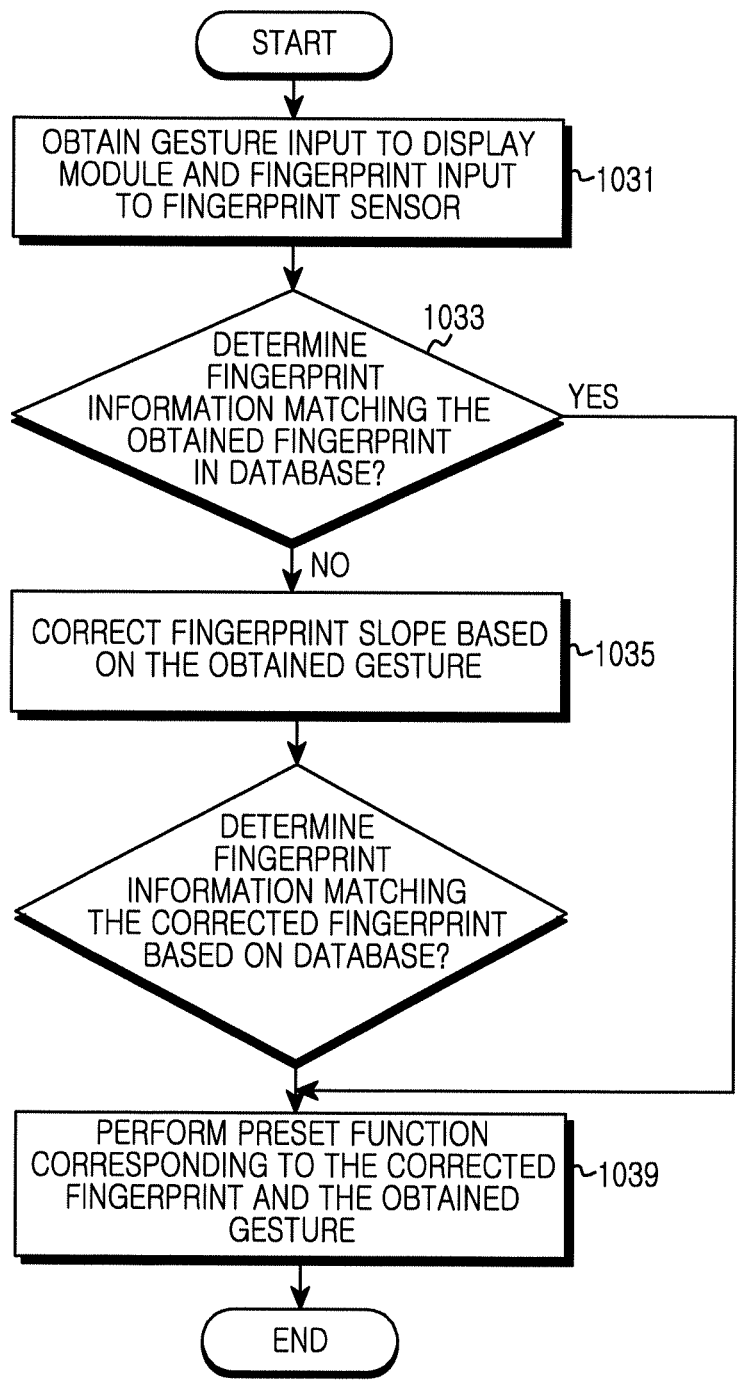

Now, an exemplary embodiment of the present disclosure is explained by referring to FIG. 10D. In step 1031, the electronic device 101 obtains the input information of the display module 150 and the fingerprint sensor 311. For example, the electronic device 101 obtains the information input to the screen with respect to the drag input which draws a preset pattern by touching and dragging the display module 150 with the input means, and obtains the fingerprint information of the input means input to the fingerprint sensor 311. When obtaining the information input to the screen and the fingerprint information, the electronic device 101 obtains one or more information about whether the fingerprint information is input first and the information is input to the screen in succession, whether the information is input to the screen and the fingerprint information is input in succession, the number of one or more taps and re-touches (and the drags) of the input means in the display module 150 during the screen input information input, the number of one or more drag direction changes during the screen input information input, and the information input time to the screen of the display module 150.

In step 1033, the electronic device 101 retrieves the fingerprint information matching the obtained fingerprint information from the database. For example, the electronic device 101 receives one or more fingerprint information through the fingerprint sensor 311, and determines and store one or more functions as the setting information with respect to the setting information combining the one or more input fingerprint information or screen input information. The electronic device 101 determines the matching fingerprint information by comparing the fingerprint information obtained by the fingerprint sensor 311 with one or more fingerprint information stored in the database. The electronic device 101 goes to step 1039 when determining the matching fingerprint information, and go to step 1035 when not determining the matching fingerprint information.

In step 1035, the electronic device 101 corrects the slope of the fingerprint information input to the fingerprint sensor 311 based on the obtained screen input information. For example, when the information is input to the screen of the display module 150 and the fingerprint information is input to the fingerprint sensor 311 in succession, the electronic device 101 applies the slope of the screen input information of the display module 150 before the fingerprint information input, to the slope of the fingerprint information input to the fingerprint sensor 311. For example, when the fingerprint information is input to the fingerprint sensor 311 and the information is input to the screen of the display module 150 in succession, the electronic device 101 applies the slope of the screen input information of the display module 150 after the fingerprint information input, to the slope of the fingerprint information input to the fingerprint sensor 311. When not determining the same or similar fingerprint information stored in the electronic device 101, as or to the obtained fingerprint information, the electronic device 101 resets the slope of the fingerprint information which is determined based on the screen input information of the display module 150, to the slope for detecting the fingerprint information. The electronic device 101 corrects the slope of the fingerprint information by rotating the fingerprint information input to the fingerprint sensor 311 clockwise or counterclockwise.

In step 1039, the electronic device 101 determines the setting information matching the corrected fingerprint information and the obtained screen input information, and perform the preset function corresponding to the setting information. The electronic device 101 displays the screen of the preset operation corresponding to the determined setting information, in the display module 150. Next, the electronic device 101 finishes this process of FIG. 10D.

According to one aspect of the present disclosure, a method for operating an electronic device, comprising: obtaining information input to a display screen and fingerprint information input to a fingerprint sensor; and executing a command matching a combination of the obtained screen input information and fingerprint information. Wherein the executing of the command comprises: determining whether the combination of the obtained screen input information and fingerprint information corresponds to a combination of reference screen input information and reference fingerprint information; and when the combinations match, performing a preset function corresponding to the combination of the obtained screen input information and fingerprint information. Wherein the screen input information and the fingerprint information are input with the same input means. Wherein the screen input information comprises one or more of a gesture for touching the display, a gesture for dragging the display, and a gesture for releasing the touch, with the input means. Wherein the executing of the command further comprises: executing the command determined by distinguishing an input order of the fingerprint information and the screen input information. Wherein the executing of the command further comprises: executing the command determined by considering input time information of the screen input information in addition to the fingerprint information and the screen input information. The screen input information is information drawn in the display by combining one or more of a spelling, a character, a string, a digit, a symbol, a figure, and a pattern. The screen input information comprises one or more of trace information of the drag in one or more areas of the display which is divided into one or more virtual areas, drag time information, drag length information, and a distance from an initial input point detected by the display to the fingerprint sensor. When the input means dragged in the display is detached and the drag continues by re-touching the display within a preset time, the screen input information determines that the input means is not detached. When a drag direction changes, the screen input information comprises one or more of the number of changes and a changed angle. The fingerprint information further comprises slope information of the fingerprint information which is reset based on the screen input information of the display.

Figure 11:
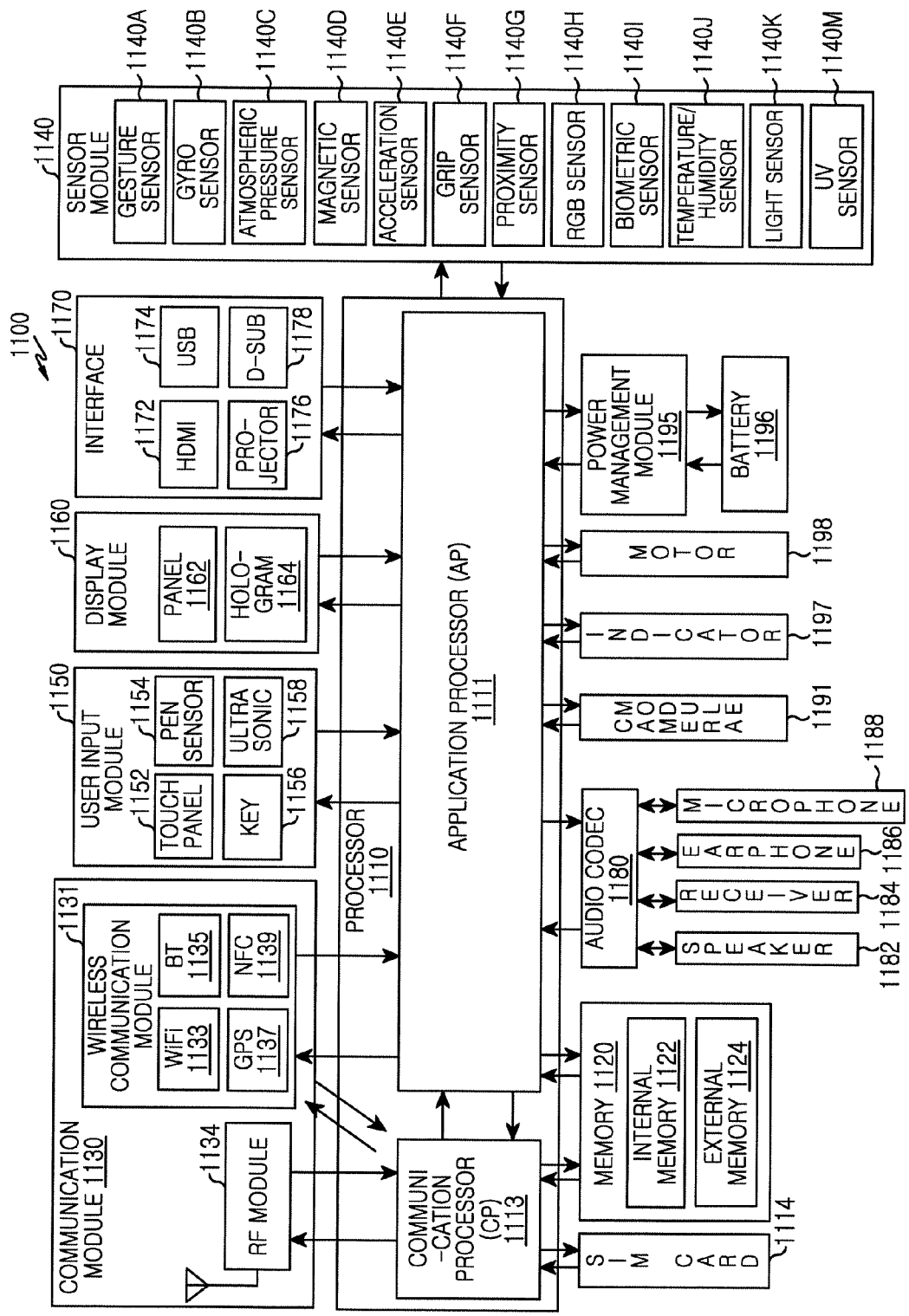
FIG. 11 illustrates example hardware according to this disclosure.

FIG. 11 illustrates example hardware according to this disclosure. The hardware 1100 configures all or part of, for example, the electronic device 101 of FIG. 1. Referring to FIG. 11, the hardware 1100 includes one or more processors 1110, a Subscriber Identity Module (SIM) card 1114, a memory 1120, a communication module 1130, a sensor module 1140, a user input module 1150, a display 1160, an interface 1170, an audio codec 1180, a camera module 1191, a power management module 1195, a battery 1196, an indicator 1197, and a motor 1198.

The processor 1110 (such as the processor 120) includes one or more Application Processors (APs) 1111 and one or more Communication Processors (CPs) 1113. The processor 1110 is, for example, the processor 120 of FIG. 1. While the AP 1111 and the CP 1113 are included in the processor 1110 of FIG. 11, the AP 1111 and the CP 1113 is included in different Integrated Circuit (IC) packages. The AP 1111 and the CP 1113 is included in a single IC package.

The AP 1111 controls hardware or software components connected to the AP 1111 by driving an operating system or an application program, and carry out data processing and operations including multimedia data. For example, the AP 1111 is implemented using a system on chip (SoC). The processor 1111 controls the sensor module 1140. The processor 1110 further include a Graphics Processing Unit (GPU).

The CP 1113 manages data links and convert a communication protocol in the communication between the hardware 1100 (such as the electronic device 111) and other electronic devices connected over the network. The CP 1113 is implemented using, for example, a SoC. The CP 1113 performs at least part of a multimedia control function. The CP 1113 identifies and authenticates the electronic device in the communication network using the SIM card 1114. In so doing, the CP 1113 provides the user with services including voice telephony, video telephony, text message, and packet data.

The CP 1113 controls the data transmission and reception of the communication module 1130. While the components of the CP 1113, the power management module 1195, and the memory 1120 are separated from the AP 1111 in FIG. 11, the AP 1111 includes part (such as the CP 1113) of those components.

The AP 1111 or the CP 1113 loads and processes the instruction or the data received from its non-volatile memory or at least one of the other components, in a volatile memory. The AP 1111 or the CP 1113 stores data received from or generated by at least one of the other components, in the non-volatile memory.

The SIM card 1114 is inserted to a slot formed at a specific location of the electronic device. The SIM card 1114 includes unique identification information (such as Integrated Circuit Card Identifier (ICCID)) or subscriber information (such as International Mobile Subscriber Identity (IMSI)).

The memory 1120 includes an internal memory 1122 and an external memory 1124. For example, the memory 1120 is the memory 130 of FIG. 1. The internal memory 1122 includes at least one of the volatile memory (such as Dynamic Random Access Memory (DRAM), Static RAM (SRAM), Synchronous DRAM (SDRAM)) and the non-volatile memory (such as One-Time Programmable Read Only Memory (OTPROM), PROM, Erasable PROM (EPROM), Electrically EPROM (EEPROM), mask ROM, flash ROM, NAND flash memory, NOR flash memory). The internal memory 1122 employs a Solid State Drive (SSD). The external memory 1124 further includes a flash drive, for example, a Compact Flash (CF), a Secure Digital (SD), a Micro-SD, a Mini-SD, an extreme digital (xD), and a memory stick.

The communication module 1130 includes a wireless communication module 1131 and a Radio Frequency (RF) module 1134. For example, the communication module 1130 is the communication interface 160 of FIG. 1. The wireless communication module 1131 includes a Wi-Fi 1133, a BT 1135, a GPS 1137, and an NFC 1139. For example, the wireless communication module 1131 provides a wireless communication function using a radio frequency. Additionally or substantially, the wireless communication module 1131 includes a network interface (such as LAN card) or a modem for connecting the hardware 1100 to the network (such as Internet, LAN, WAN, telecommunication network, cellular network, satellite network, or POTS).

The RF module 1134 controls the data transmission and reception, for example, the transmission and reception of the RF signal. For example, the RF module 1134 includes a transceiver, a Pulse Amplitude Modulation (PAM), a frequency filter, or a Low Noise Amplifier (LNA), which is not depicted in the drawing. The RF module 1134 further includes a component, for example, a conductor or a conducting wire, for sending and receiving electromagnetic waves in a free space in the wireless communication.

The sensor module 1140 includes at least one of, for example, a gesture sensor 1140A, a gyro sensor 1140B, an atmospheric pressure sensor 1140C, a magnetic sensor 1140D, an acceleration sensor 1140E, a grip sensor 1140F, a proximity sensor 11406, a Red Green Blue (RGB) sensor 1140H, a biometric sensor 1140I, a temperature/humidity sensor 1140J, a light sensor 1140K, and an UltraViolet (UV) sensor 1140M. The sensor module 1140 measures a physical quantity or detects the operation status of the electronic device, and convert the measured or detected information to an electric signal. Additionally/substantially, the sensor module 1140 includes an E-noise sensor, an electromyography (EMG) sensor, an electroencephalogram (EEG) sensor, an electrocardiogram (ECG) sensor, an infrared (IR) sensor, an iris sensor, or a finger print sensor. The sensor module 1140 further includes a control circuit for controlling its one or more sensors.

The user input module 1150 includes a touch panel 1152, a (digital) pen sensor 1154, a key 1156, and an ultrasonic input device 1158. The user input module 1150 is, for example, the input/output interface 140 of FIG. 1. The touch panel 1152 recognizes the touch input using at least one of capacitive, resistive, infrared, and Surface Acoustic Wave (SAW) techniques. The touch panel 1152 further includes a controller. The capacitive touch panel recognizes the direct touch or the proximity. The touch panel 1152 further includes a tactile layer. In this case, the touch panel 1152 provides a tactile response to the user.

The (digital) pen sensor 1154 is implemented using the same or similar method as or to the user's touch input, or using a separate recognition sheet. The key 1156 includes, for example, a keypad or a touch key. The ultrasonic input device 1158, which obtains data by detecting microwave through a microphone 1188 in the electronic device, allows radio frequency identification. The hardware 1100 receives the user input from an external device (such as a network, a computer, or a server) connected using the communication module 1130.

The display module 1160 includes a panel 1162 and a hologram 1164. The display module 1160 is, for example, the display 150 of FIG. 1. The panel 1162 employs, for example, a Liquid Crystal Display (LCD) or an Active Matrix Organic Light Emitting Diode (AMOLED). The panel 1162 is implemented flexibly, transparently, or wearably. The panel 1162 is constructed as the single module together with the touch panel 1152. The hologram 1164 presents a three-dimensional image in the air using interference of light. The display module 1160 further includes a control circuit for controlling the panel 1162 or the hologram 1164.

The interface 1170 includes, for example, a high definition multimedia interface (HDMI) 1172, a USB 1174, an optical communication port 1176, and a D-sub 1178. In an embodiment, the interface 1170 includes, for example, an SD/MMC or IrDA.

The audio codec 1180 converts the voice to an electric signal and the electronic signal to the voice. The audio codec 1180 converts voice information which is input or output through a speaker 1182, a receiver 1184, an earphone 1186, or the microphone 1188.

The camera module 1191 captures a still picture and a moving picture. For example, the camera module 1191 includes one or more image sensors (such as a front lens or a rear lens), an image signal processor (ISP), or a flash LED.

The power management module 1195 manages power of the hardware 1100. Although it is not depicted here, the power management module 1195 includes, for example, a power management IC (PMIC), a charger IC, and a battery gauge or a fuel gauge.

For example, the PMIC is mounted in an IC or a SoC semiconductor. The charging type is divided to a wired type and a wireless type. The charger IC charges the battery and prevents overvoltage or overcurrent from flowing from a charger. For example, the charger IC includes a charger IC for at least one of the wired charging type or the wireless charging type. For example, the wireless charging type includes magnetic resonance, magnetic induction, and microwave, and further includes an additional circuit such as coil loop, resonance circuit, and rectifier circuit for the wireless charging.

The battery gauge measures, for example, the remaining capacity of the battery 1196 and the voltage, the current, or the temperature of the charging. The battery 1196 can be a rechargeable battery.

The indicator 1197 displays a specific status, for example, a booting state, a message state, or a charging state of the hardware 1100 or part (such as the AP 1111) of the hardware 1100. The motor 1198 converts the electric signal to a mechanic vibration.

Although it is not depicted, the hardware 1100 includes a processor (such as the GPU) for supporting mobile TV. For example, the processor for supporting the mobile TV processes media data in conformity with Digital Multimedia Broadcasting (DMB), Digital Video Broadcasting (DVB), or media flow standard. The aforementioned components of the hardware include one or more parts, and the name of the corresponding component differs according to the type of the electronic device. The hardware of the present disclosure includes at least one of the components, omit some components, or further include other components. Some of the hardware components are united to the single entity to carry out the same functions of the corresponding components.

As set forth above, it is possible to diversify the command for controlling the electronic device by combining the fingerprint information input to the electronic device and the preset operation input to the display (such as the screen input information of the display).

The methods as described in the claims or the specification of exemplary embodiments of the present disclosure is implemented using hardware, software, or a combination of them.

According to one aspect of the present disclosure, an electronic device comprising: a memory configured to store information input to a screen, fingerprint information, and a command corresponding to a combination of the screen input information and the fingerprint information; and one or more processors configured to obtain the screen input information and the fingerprint information input to a fingerprint sensor, and executing a command matching the combination of the screen input information and the fingerprint information. Wherein the processor determines whether the combination of the obtained screen input information and fingerprint information corresponds to a combination of reference screen input information and reference fingerprint information, and performs a preset function corresponding to the combination of the obtained screen input information and fingerprint information. Wherein the processor obtains the screen input information and the fingerprint information with the same input means. Wherein the processor generates the screen input information using one or more of a gesture for touching the display, a gesture for dragging the display, and a gesture for releasing the touch, with the input means. Wherein the processor executes the command determined by distinguishing an input order of the fingerprint information and the screen input information. Wherein the processor executes the command determined by considering input time information of the screen input information in addition to the fingerprint information and the screen input information. Wherein the processor determines the screen input information drawn in the display by combining one or more of a spelling, a character, a string, a digit, a symbol, a figure, and a pattern. Wherein the processor determines the screen input information comprising one or more of trace information of the drag in one or more areas of the display which is divided into one or more virtual areas, drag time information, drag length information, and a distance from an initial input point detected by the display to the fingerprint sensor. Wherein, when the input means dragged in the display is detached and the drag continues by re-touching the display within a preset time, the processor determines that the input means is not detached in the screen input information. Wherein, when a drag direction changes, the processor determines the screen input information comprising one or more of the number of changes and a changed angle. Wherein the processor resets a slope of the fingerprint information based on the screen input information of the display.

As for the software, a computer-readable storage medium including one or more programs (software modules) is provided. One or more programs stored in the computer-readable storage medium are configured for execution by one or more processors of an electronic device. One or more programs include instructions for controlling the electronic device to execute the methods according to the exemplary embodiments as described in the claims or the specification of the present disclosure.

Such a program (software module, software) is stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs are stored to a memory combining part or all of those recording media. A plurality of memories is equipped.

The programs is stored in an attachable storage device accessible via a communication network such as Internet, Intranet, Local Area Network (LAN), Wide LAN (WLAN), or Storage Area Network (SAN), or a communication network by combining these networks. The storage device accesses the present electronic device through an external port. A separate storage device accesses the present electronic device over a communication network.

The term "module" used in various exemplary embodiments of the present disclosure indicates, for example, a unit including a combination of one or more of hardware, software, or firmware. The "module" is interchangeably used with the term, for example, a unit, logic, a logical block, a component, or a circuit. The "module" is a minimum unit or part of the components integrally formed. The "module" is a minimum unit or part for one or more functions. The "module" is implemented mechanically or electronically. For example, the "module" in the present disclosure includes at least one of an Application-Specific Integrated Circuit (ASIC) chip, Field-Programmable Gate Arrays (FPGAs), or a programmable-logic device for performing operations which are well known or to be invented.

At least part of the apparatus (such as modules or functions) or the method (such as operations) according to various exemplary embodiments of the present disclosure is implemented as, for example, instructions stored in computer-readable storage media in the form of the programming module. When the instruction is executed by one or more processors (such as the processor 1111), the one or more processors performs the function corresponding to the instruction. The computer-readable storage medium is, for example, the memory 1120. At least part of the programming module is realized (such as executed) by, for example, the processor 1111. At least part of the programming module includes, for example, a module, a program, a routine, sets of instructions, or a process for one or more functions.

The programming module according to various exemplary embodiments of the present disclosure includes at least one of the aforementioned components, omit some components, or further include other components. The operations fulfilled by the modules, the programming modules, or other components according to various exemplary embodiments of the present disclosure are carried out in sequence, in parallel, repeatedly, or heuristically. Also, some operations is executed in a different order or omitted, or other operations are added.

The computer-readable recording medium include magnetic media such as hard disk, floppy disk and magnetic tape, optical media such as Compact Disc Read Only Memory (CD-ROM) and Digital Versatile Disc (DVD), magneto-optical media such as floptical disk, and hardware devices specifically configured to store and execute the program instruction (such as the programming module) such as ROM, RAM, and flash memory. Also, the program instruction includes not only a machine code made by a complier but also a high-level language code executable by a computer using an interpreter. The above-stated hardware device serves as one or more software modules for fulfilling the operations of various exemplary embodiments of the present disclosure, and vice versa.

While the disclosure has been shown and described with reference to certain exemplary embodiments thereof, it will be understood by those skilled in the art that various changes in form and details is made therein without departing from the spirit and scope of the disclosure as defined by the appended claims and their equivalents.

What is claimed is:

1. A method for operating an electronic device, comprising:
   detecting a drag input on a display screen, the drag input starting or ending at a position where a finger sensor is disposed;
   obtaining, based in part on the detected drag input, a screen input information from the display screen and a fingerprint information from the fingerprint sensor, wherein the finger sensor is configured to recognize and distinguish between the fingerprint information and the input means; and
   executing a command matching a combination of the obtained screen input information and fingerprint information,
   wherein the finger sensor is disposed at the position that is not overlapped with the display screen and that is a specific position of a bezel of the electronic device.

2. The method of claim 1, wherein executing the command comprises:
   determining whether the combination of the obtained screen input information and fingerprint information corresponds to a combination of reference screen input information and reference fingerprint information; and
   when the combinations match, performing a preset function corresponding to the combination of the obtained screen input information and fingerprint information.

3. The method of claim 1, wherein the screen input information and the fingerprint information are input with the same input means.

4. The method of claim 1, wherein the screen input information comprises one or more of a gesture for touching the display screen, a gesture for dragging the display screen, and a gesture for releasing the touch, with an input means.

5. The method of claim 1, wherein executing the command further comprises:

executing the command determined by distinguishing an input order of the fingerprint information and the screen input information.

6. The method of claim 1, wherein executing the command further comprises:
executing the command determined by considering input time information of the screen input information in addition to the fingerprint information and the screen input information.

7. The method of claim 1, wherein the screen input information is information drawn in the display screen by combining one or more of a character, a string, a digit, a symbol, a figure, or a pattern.

8. The method of claim 1, wherein the screen input information comprises one or more of trace information of the drag in one or more areas of the display screen that is divided into one or more virtual areas, drag time information, drag length information, and a distance from an initial input point detected by the display screen to the fingerprint sensor.

9. The method of claim 1, wherein, when a drag direction changes, the screen input information comprises one or more of the number of changes and a changed angle.

10. The method of claim 1, wherein the fingerprint information further comprises slope information of a fingerprint.

11. An electronic device comprising:
a display screen;
at least one sensor including a finger sensor;
one or more processors configured to detect a drag input on the display screen, the drag input starting or ending at a position where the finger sensor is disposed, obtain, based in part on the detected drag input, the screen input information from the display screen and the fingerprint information from the fingerprint sensor, the fingerprint information being recognized by the finger sensor to distinguish between input means, and executing a command matching the combination of the screen input information and the fingerprint information,
a memory configured to store the screen input information, the fingerprint information, and the command,
wherein the finger sensor is disposed at the position which is not overlapped with the display screen and which is a specific position of a bezel of the electronic device.

12. The electronic device of claim 11, wherein the processor is configured to determine whether the combination of the obtained screen input information and fingerprint information corresponds to a combination of reference screen input information and reference fingerprint information, and perform a preset function corresponding to the combination of the obtained screen input information and fingerprint information.

13. The electronic device of claim 11, wherein the processor is configured to obtain the screen input information and the fingerprint information with the same input means.

14. The electronic device of claim 11, wherein the processor is configure to generate the screen input information using one or more of a gesture for touching the display screen, a gesture for dragging the display screen, and a gesture for releasing the touch, with an input means.

15. The electronic device of claim 11, wherein the processor is configured to execute the command determined by distinguishing an input order of the fingerprint information and the screen input information.

16. The electronic device of claim 11, wherein the processor is configured the command determined by considering input time information of the screen input information in addition to the fingerprint information and the screen input information.

17. The electronic device of claim 11, wherein the processor is configured to determine the screen input information drawn in the display screen by combining one or more of a character, a string, a digit, a symbol, a figure, or a pattern.

18. The electronic device of claim 11, wherein the processor is configured to determine the screen input information comprising one or more of trace information of the drag in one or more areas of the display which is divided into one or more virtual areas, drag time information, drag length information, and a distance from an initial input point detected by the display to the fingerprint sensor.

19. The electronic device of claim 11, wherein, when a drag direction changes, the processor is configured to determine the screen input information comprising one or more of the number of changes and a changed angle.

20. The electronic device of claim 11, wherein the fingerprint information further comprises slope information of a fingerprint.

* * * * *

UNITED STATES PATENT AND TRADEMARK OFFICE
CERTIFICATE OF CORRECTION

PATENT NO.        : 9,489,127 B2
APPLICATION NO.   : 14/598190
DATED             : November 8, 2016
INVENTOR(S)       : Geon-Soo Kim et al.

Page 1 of 1

It is certified that error appears in the above-identified patent and that said Letters Patent is hereby corrected as shown below:

On the Title Page

Item [72], fourth inventor should be inserted after "Dong-Hyun Yeom" as follows:
-- Pil-Joo Yoon, Gyeonggi-do (KR) --.

Signed and Sealed this
Twenty-ninth Day of May, 2018

Andrei Iancu
*Director of the United States Patent and Trademark Office*